United States Patent
Allevato, III

(10) Patent No.: US 11,819,094 B2
(45) Date of Patent: Nov. 21, 2023

(54) SWIVEL LOCK QUICK RELEASE DEVICE

(71) Applicant: KITe Global LLC, Tustin, CA (US)

(72) Inventor: Sam Christopher Allevato, III, Tustin, CA (US)

(73) Assignee: KITe Global LLC, Tustin, CA (US)

( * ) Notice: Subject to any disclaimer, the term of this patent is extended or adjusted under 35 U.S.C. 154(b) by 0 days.

(21) Appl. No.: 17/930,393

(22) Filed: Sep. 7, 2022

(65) Prior Publication Data

US 2023/0000217 A1 Jan. 5, 2023

Related U.S. Application Data

(63) Continuation of application No. PCT/US2022/042543, filed on Sep. 2, 2022, which is
(Continued)

(51) Int. Cl.
*B63B 32/73* (2020.01)
*A44B 99/00* (2010.01)
(Continued)

(52) U.S. Cl.
CPC ............ *A44B 99/005* (2013.01); *B63B 32/45* (2020.02); *A45F 2005/026* (2013.01);
(Continued)

(58) Field of Classification Search
CPC .......... B63B 32/73; B63H 8/18; F16B 21/165
See application file for complete search history.

(56) References Cited

U.S. PATENT DOCUMENTS

| 2,565,572 A | 8/1951 | Pangborn |
| 4,041,562 A | 8/1977 | Nealy |

(Continued)

FOREIGN PATENT DOCUMENTS

| AU | 199923784 A1 | 10/2000 |
| DE | 20202347 U1 | 7/2002 |

(Continued)

OTHER PUBLICATIONS

International Search Report and Written Opinion of the International Searching Authority for International Application No. PCT/US2020/070804, dated Apr. 30, 2021, in 18 pages.
(Continued)

*Primary Examiner* — Andrew Polay
(74) *Attorney, Agent, or Firm* — Knobbe Martens Olson & Bear LLP

(57) ABSTRACT

The swivel lock quick release device is adapted to selectively attach a user to a sports equipment. The sports equipment may be watersports equipment, such as a surfboard, a kite surfing apparatus, a stand-up paddle board, sailing equipment, a wake board, etc., or land sports equipment, such as fishing, camping, climbing, animal collars or leashes, tactical rifle apparatus, and hunting equipment. The swivel lock quick release device can have a pull release and a protrusion, the pull release and the protrusion being adapted to be selectively engaged in a locked position is provided. A slide handle, a portion of the pull release, is adapted to be selectively moved in a coaxial direction by the user to disengage the pull release and the protrusion. The pull release can also be adapted to rotate or swivel around the protrusion.

26 Claims, 27 Drawing Sheets

Related U.S. Application Data a continuation-in-part of application No. PCT/US2020/070804, filed on Nov. 19, 2020, and a continuation of application No. PCT/US2020/070804, filed on Nov. 19, 2020, and a continuation-in-part of application No. 17/081,197, filed on Oct. 27, 2020, and a continuation of application No. 17/081,197, filed on Oct. 27, 2020.

(60) Provisional application No. 63/363,708, filed on Apr. 27, 2022, provisional application No. 63/261,013, filed on Sep. 8, 2021.

(51) Int. Cl.
  *B63B 32/40*    (2020.01)
  *A45F 5/02*     (2006.01)
  *B63H 8/18*     (2020.01)
  *F16B 21/16*    (2006.01)

(52) U.S. Cl.
  CPC .......... *B63B 32/73* (2020.02); *B63B 2221/12* (2013.01); *B63B 2221/22* (2013.01); *B63H 8/18* (2020.02); *F16B 21/165* (2013.01)

(56) References Cited

U.S. PATENT DOCUMENTS

| | | |
|---|---|---|
| 4,127,247 A | 11/1978 | Strasilla |
| 4,267,615 A | 5/1981 | Nealy |
| 4,610,634 A | 9/1986 | Kimura |
| 4,759,306 A | 7/1988 | McKenzie |
| D303,278 S | 9/1989 | Nealy |
| 5,243,710 A | 9/1993 | Craycroft |
| 5,531,622 A | 5/1996 | Nealy |
| 5,643,028 A | 7/1997 | Craig |
| 5,685,751 A | 11/1997 | Feyas |
| 5,957,741 A | 9/1999 | Evans |
| D677,354 S | 3/2013 | Nolan et al. |
| 8,500,358 B1 | 8/2013 | Cassidy |
| 2012/0023806 A1 | 2/2012 | Henry, Jr. |
| 2015/0028158 A1 | 1/2015 | Zangirolami |
| 2017/0198739 A1 | 7/2017 | Bensoussan et al. |
| 2018/0274629 A1* | 9/2018 | Lee ................. F16B 21/165 |
| 2021/0100219 A1 | 4/2021 | Myerscough |
| 2022/0126954 A1 | 4/2022 | Allevato |

FOREIGN PATENT DOCUMENTS

| | | |
|---|---|---|
| DE | 202004006143 U1 | 8/2004 |
| DE | 202005007521 U1 | 8/2005 |
| EP | 633629 A1 | 1/1995 |
| FR | 2812055 A1 | 1/2002 |
| GB | 2000238 A | 1/1979 |
| IT | FI20090227 A1 | 4/2011 |
| JP | 2008-267517 A | 11/2008 |
| WO | WO 2012/145184 A2 | 10/2012 |
| WO | WO 2012/172581 A1 | 12/2012 |
| WO | WO 2022/093297 A1 | 5/2022 |

OTHER PUBLICATIONS

International Search Report and Written Opinion of the International Searching Authority for International Application No. PCT/US2022/042543, dated Dec. 7, 2022, in 30 pages.

Sep. 13, 2012 International Search Report for PCT/IT2012/000139, 5 pages.

Search Report in corresponding International Patent Application No. PCT/US2022/042543, dated Dec. 7, 2022, in 26 pages.

* cited by examiner

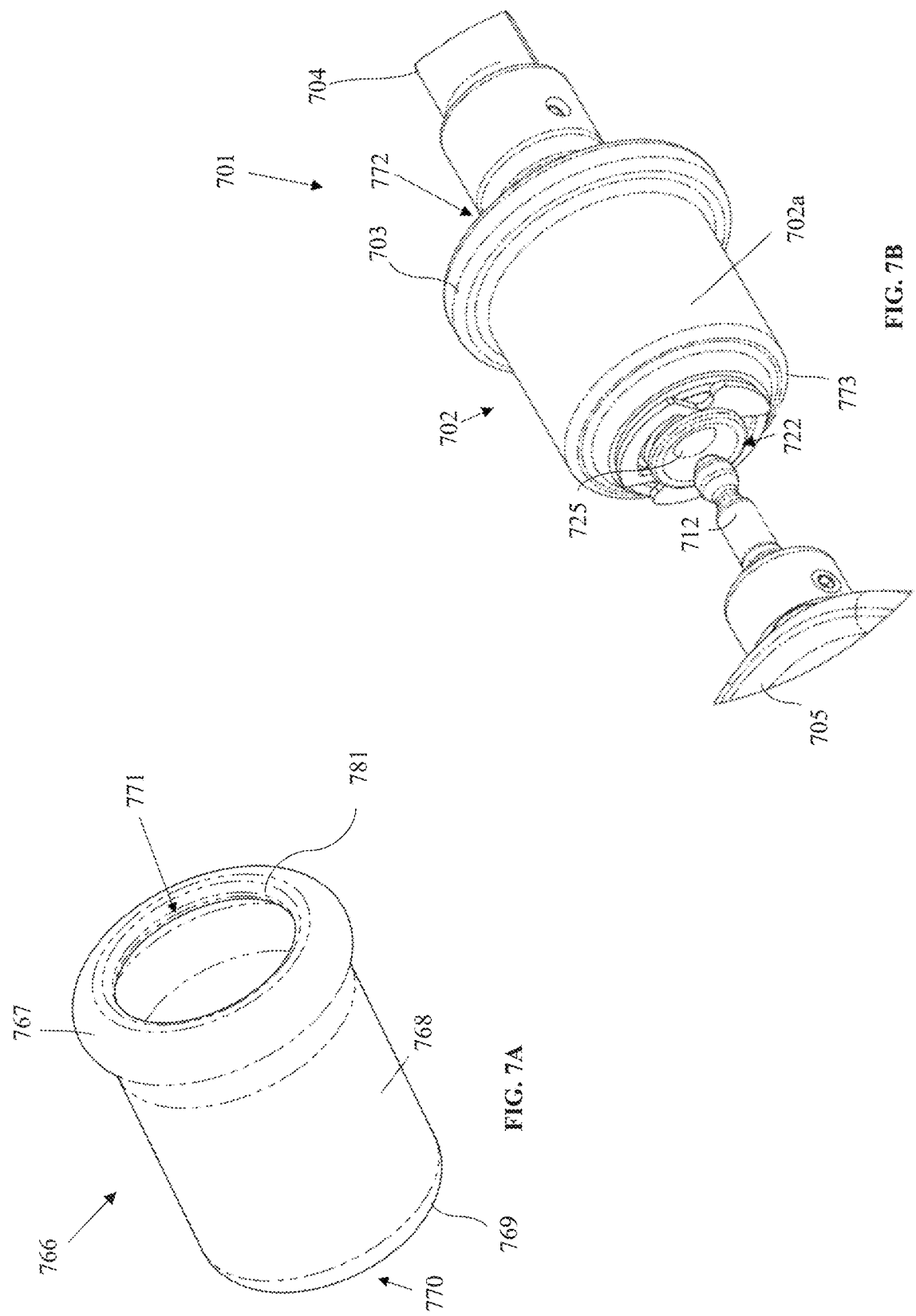

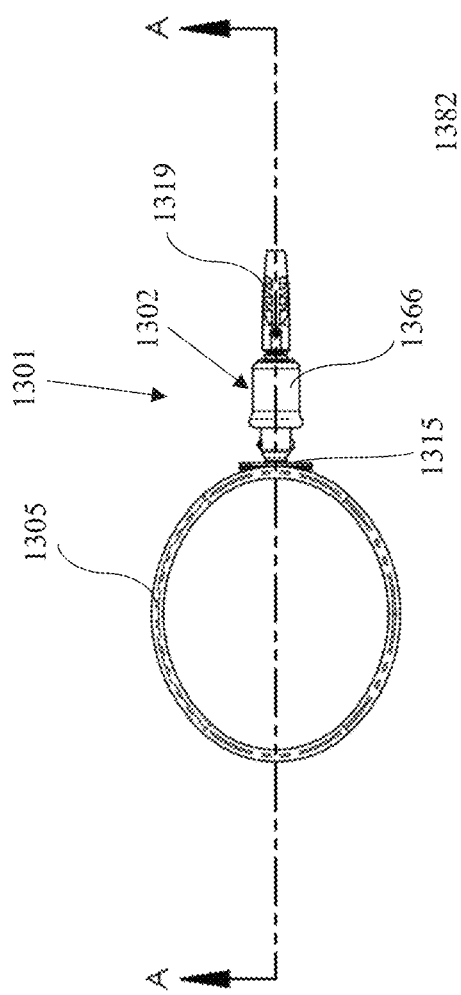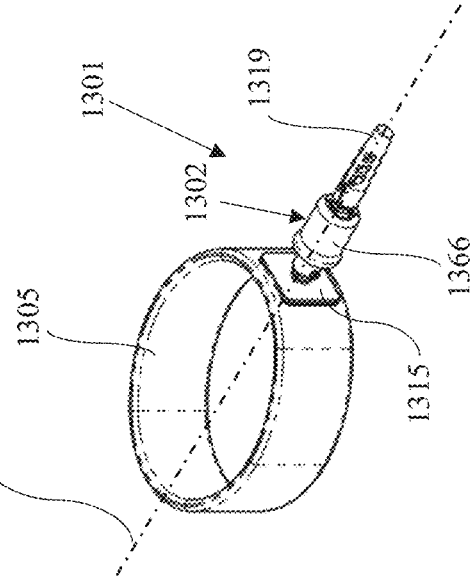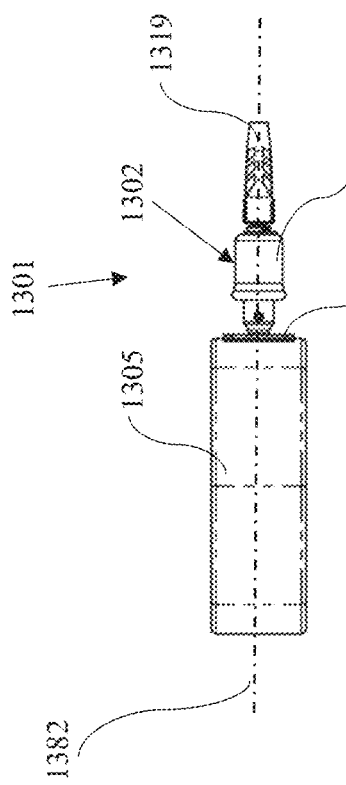

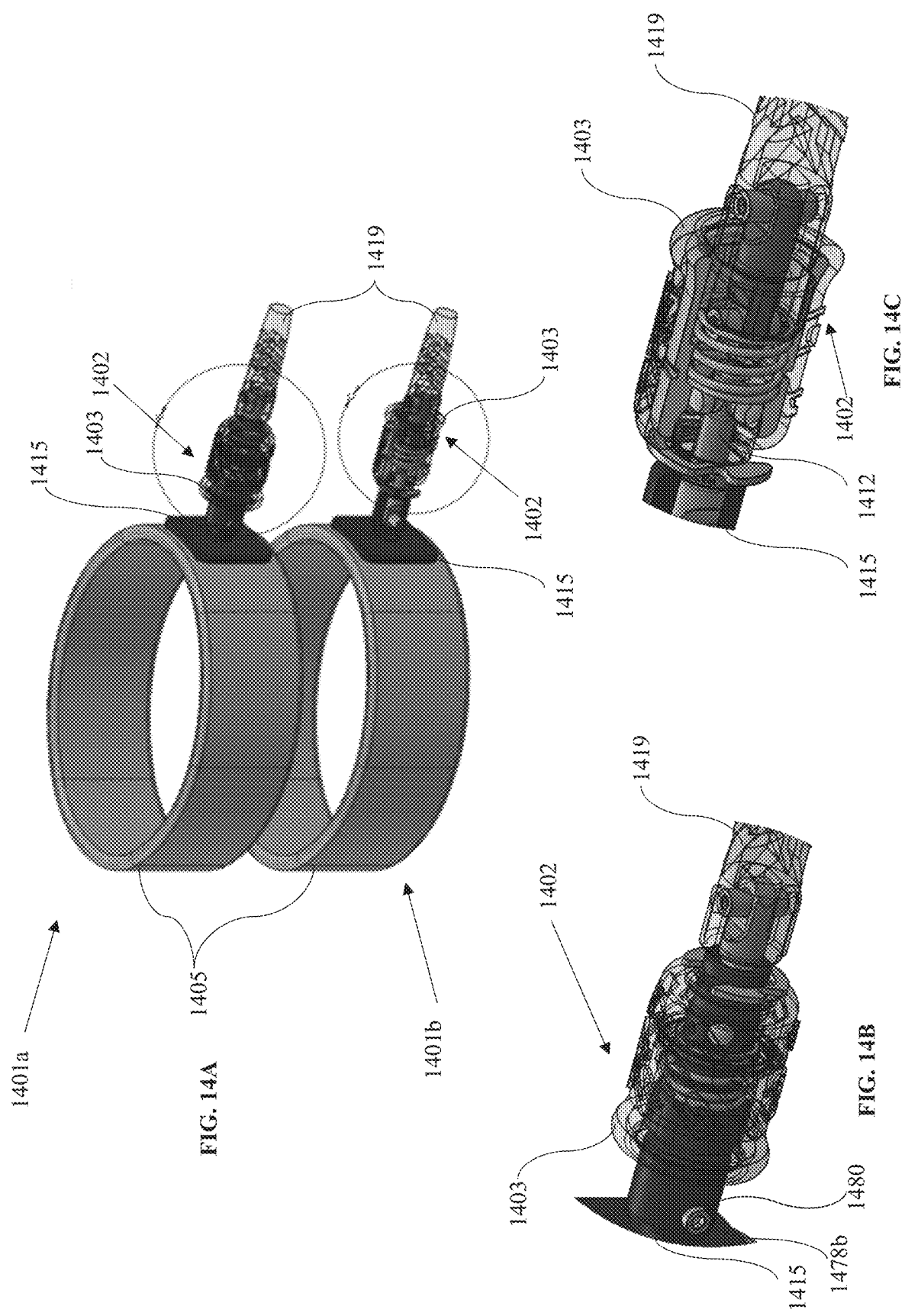

SWIVEL LOCK QUICK RELEASE DEVICE

INCORPORATION BY REFERENCE TO ANY PRIORITY APPLICATIONS

This application is a continuation of International (PCT) Patent Application No. PCT/US2022/042543, filed Sep. 2, 2022, which claims the benefit of U.S. Provisional Application No. 63/261,013, filed Sep. 8, 2021, and U.S. Provisional Application No. 63/363,708, filed Apr. 27, 2022, and is a continuation-in-part of U.S. Non-Provisional application Ser. No. 17/081,197, filed Oct. 27, 2020, and PCT Application No. PCT/US2020/070804, filed Nov. 19, 2020, the entire contents of each are hereby incorporated by reference and made a part of this specification. Any and all applications for which a foreign or domestic priority claim is identified in the Application Data Sheet as filed with the present application are hereby incorporated by reference under 37 CFR 1.57.

BACKGROUND

Field

The disclosure relates generally to equipment attachments, for example, to a swivel lock quick release mechanism for attaching to equipment.

Description of the Related Art

Currently, users who participate in watersports, for example, are at risk when using a tether to keep them attached to their board, flotation device, or sporting equipment because of the common occurrences of the tether becoming tangled with other objects in the body of water or failure of other equipment involved in the activity. Typical dangerous scenarios include: (1) the user and the board going in different directions around large objects at high speeds; and (2) the user being held under the water because of turbulence and heavy water in large surf or when the tether attaches to a rock, macroalgae, or coral in the body of water; (3) turbulent water keeping the board submerged and, in turn, also keeping the attached user underwater. These tethers pose the problem by keeping the user attached to a sporting equipment even if it is a dangerous situation. If users are unable to easily, quickly, and reliably detach from a tether, then users risk injuries due to becoming tangled in the tether or submerged underwater. One method to detach from a tether is to use a swivel lock quick release mechanism.

However, even if users are provided with a swivel lock quick release mechanism to detach from the tether, users may still have difficulties detaching. For example, the quick release handle of the swivel lock quick release mechanism could become slippery when wet, making it difficult for users to grip the quick release handle. Even when dry, swivel lock quick release mechanism can be difficult to grip. Additionally, in dangerous situations users may become disoriented, making it difficult to locate the quick release handle and grip it to activate the device. Furthermore, users can get injured, or surfaces can be damaged if hit by the quick release mechanism during dangerous situations.

Users who participate in watersports, for example, are also at risk if the tether becomes detached when unintended. For example, if a tether detaches when unintended a disoriented surfer may not be able to safely resurface and get back on top of their surfboard. Thus, problems may arise if the release mechanism becomes corroded from water and the environment. Additionally, many apparatuses using to tether to secure a user to an object may be provided as a singular monolithic unit with no means to selectively separate the apparatus from the strap or tether. This inability of said apparatus to be selectively disassembled may prevent the modification or replacement of specific parts of said apparatus, thus requiring the usage of separate apparatuses to use different types or sizes of straps or tethers.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

SUMMARY

Therefore, there is a need to solve the problems described above by providing a device and method for a locking attachment that will quick release without an additional removeable pin from a tether.

In some aspects, the techniques described herein relate to a swivel lock quick release device, the device having a protrusion, locking component, and a pull release adapted to receive the protrusion. The pull release also having a slide handle and a locking component with a spring to allow a user to disengage from the protrusion and reengage without a detachable key, pin, or object. Thus, an advantage is having the spring with an appropriate stiffness to ensure the spring does not accidently release during water activities and would still allow the user's force to disconnect the pull release from the protrusion when necessary. Thus, another advantage is a quick and reliable detachment during dangerous situations.

In some aspects, the techniques described herein relate to a swivel lock quick release device having a swivel mechanism that allows for the lock and release to freely swivel and does not require removeable parts, key, or pin. The swivel allows for the tether to turn instead of becoming twisted around objects or wound itself. Thus, an advantage is the user not getting tangled up in their tether and the tether does not get coiled around itself. Becoming tangled in a tether or having the tether caught on various objects is dangerous, which is why the rotating aspect of the swivel lock quick release device may be advantageous.

In another aspect, the techniques described herein relate to a swivel lock quick release device that allows for a fully self-contained integrated device that does not require additional parts or removable lock to be utilized. The disclosed swivel lock functions as both a locking apparatus that swivels as well as an easily accessible quick release handle. Thus, it is an integrated locking and releasing system.

In some aspects, the swivel lock quick release may utilize removable securing bits to attach said swivel lock quick release to a strap and a tether. Thus, both the strap and tether may be removed and replaced as needed for an application through the simple removal and subsequent reinstallation of a securing bit attaching the swivel lock quick release to the corresponding strap and/or tether allowing for easy implementation of alternative tethers, straps, or other comparable components.

In some aspects, the swivel lock quick release may be oriented within a tether assembly such that the user may disengage from the sporting equipment by pulling the slide handle toward their body. This may facilitate fast and reliable disengagement of the pull release from the protrusion as a result of the user being able to use their body as a backing support and compress the swivel lock quick release between their hand and their body to facilitate disengagement from said sporting equipment quickly and easily.

In some aspects, the techniques described herein relate to a grip cover configured to cover the pull release of a swivel lock quick release device (also referred to herein as "swivel lock"). The cylindrical grip body, grip ridge, ridge grip end and recess grip end of the grip cover correspondingly cover the body, grip, ridge end and recess end of the pull release, wherein said grip cover conforms to the shape of the pull release. Thus, the grip cover and pull release handle are flush. It should be understood that the shape of the grip cover can be manufactured to cover a multitude of configurations of a pull release, for example a pull release with two separate ridges for grips.

In some aspects, a grip cover can be manufactured from materials with a high coefficient of static friction when wet. Additionally, the grip cover can be designed to have a textured surface, such as ridges or bumps. Providing a grip cover reduces slipperiness of the quick release handle and improves user engagement, thus enabling users to operate a swivel lock more easily.

In some aspects, a grip cover provides a swivel lock with flotation, which can help users more quickly find and operate the swivel lock by making the swivel lock float. For example, floatation can be achieved by designing the grip cover from a buoyant foam material. Additionally, a foam grip cover may protect users from damaging their hands while operating the swivel lock or being injured by accidentally hitting the swivel lock during a dangerous scenario, for example. Thus, providing a grip cover for a swivel lock can help users operate the swivel lock more quickly during dangerous situations.

In some aspects, a grip cover may be configured to protect the internal locking components of a swivel lock by manufacturing the grip cover from a waterproof material and designing the grip cover to conform around and seal the openings on both ends of the swivel lock mechanisms. Thus, providing a grip cover for a swivel lock that covers the recess end and ridge end of said swivel lock may increase the reliability of a swivel lock by preventing degradation due to corrosion or other environmental factors.

In some aspects, the techniques described herein relate to a grip cover having a grip body with a regular cylindrical shape; a ridge side opening disposed on one end of the grip body; a recess side opening disposed on an opposite end of the grip body; a grip ridge secured between the grip body and the ridge side opening; and/or an internal ridge nested within the grip body, and/or wherein the grip body is configured to cover a pull release on a swivel lock. The grip cover may be made a foam material configured to enhance engagement between a user's hand and the pull release. Said grip cover may also provide buoyancy to the swivel lock and render it waterproof. The swivel lock may attach a user to a floatation device, such that the user may pull said covered pull release toward their body to disengage from the floatation device quickly and easily.

In some aspects, the techniques described herein relate to a swivel lock quick release device adapted to selectively attach a user to a sports equipment, the swivel lock quick release device including one or more of the following: a tether adapted to attach to the sports equipment; a strap adapted to attach to a user; a protrusion attached to the tether, the protrusion having an indentation; a pull release attached to the strap, the pull release having: a slide handle including one or more of the following: a grip a ridge slot; a locking component having: a recess nested within the locking component, the recess being configured to receive the protrusion; and a spring disposed between the slide handle and the locking component, wherein the pull release has a first position and a second position, the first position being when the spring is in a normal, uncompressed state, the second position being when the spring is compressed; and a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and/or an internal ridge nested within the grip body, wherein the strap is configured to be selectively coupled to the tether, such that the user may be selectively coupled to the sports equipment. The term "selectively coupled" may include both "coupling and uncoupling" wherein the grip body is configured to cover the pull release on a swivel lock quick release device, wherein the grip ridge is configured to cover and engage with the grip on the slide handle and the internal ridge is configured to nest within the ridge slot of the slide handle, and/or wherein the pull release is adapted to rotate around the protrusion.

In some aspects, the techniques described herein relate to a swivel lock quick release device, wherein the slide handle is configured to be pulled in a coaxial direction toward the user to disengage the protrusion from the pull release.

In some aspects, the techniques described herein relate to a swivel lock quick release device, wherein the pulling of the slide handle toward the user is easier to do than pulling the slide handle away from the user as a result of the swivel lock quick release device being compressed between the user and their hand when pulling the slide release toward the user.

In some aspects, the techniques described herein relate to a swivel lock quick release device, further including a first securing bit configured to secure the pull release to the strap and a second securing bit configured to secure the protrusion to the tether.

In some aspects, the techniques described herein relate to a swivel lock quick release device, wherein the first securing bit may be removed and reinstalled to facilitate the attachment of different straps to the swivel lock quick release device.

In some aspects, the techniques described herein relate to a swivel lock quick release device, wherein the second securing bit may be removed and reinstalled to facilitate the attachment of different tethers to the swivel lock quick release device.

In some aspects, the techniques described herein relate to a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and wherein the grip cover is configured to cover a swivel lock quick release device, the swivel lock quick release device including one or more of the following: a first connector; and/or a second connector, and/or wherein the first and second connector are configured to be selectively engaged in a locked position, a portion of the first connector being adapted to be selectively moved in a coaxial direction by the user to disengage the first and second connector, such that the first connector and second connector may be selectively coupled to each other. The term "selectively coupled" may include both "coupling and uncoupling" wherein the grip body is configured to cover the first connector of a swivel lock quick release device and the grip ridge is configured to engage with the first connector.

In some aspects, the techniques described herein relate to a grip cover, wherein the grip cover is further included of a recess grip end surrounding the recess side opening and a ridge grip end surrounding the ridge side opening, wherein the recess grip end and ridge grip end curve inward and have smaller diameters than the grip body.

In some aspects, the techniques described herein relate to a grip cover, wherein the recess grip end is configured to seal a recess end on the first connector and the ridge grip end is configured to seal a ridge end of the first connector, wherein the sealing of the recess end and the ridge end prevents water or other materials from entering the swivel lock quick release device.

In some aspects, the techniques described herein relate to a grip cover, wherein the first connector is a pull release, and the pull release is configured to attach to a strap.

In some aspects, the techniques described herein relate to a grip cover, wherein the second connector is a protrusion, and the protrusion is configured to attach to a tether.

In some aspects, the techniques described herein relate to a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and/or an internal ridge nested within the grip body, and/or wherein the grip body is configured to cover a pull release on a quick release lock.

In some aspects, the techniques described herein relate to a grip cover, wherein the grip ridge is configured to secure a grip on the quick release lock to improve engagement between the grip cover and the quick release lock.

In some aspects, the techniques described herein relate to a grip cover, wherein the internal ridge is configured nest within a ridge slot on the pull release to improve engagement between the grip cover and the quick release lock.

In some aspects, the techniques described herein relate to a grip cover, wherein the grip cover is made of a buoyant material, wherein the buoyant material of the grip cover is configured to make the quick release lock float to make the quick release lock easier to find while submerged.

In some aspects, the techniques described herein relate to a grip cover, wherein the grip cover prevents a user from being injured through collision with quick release lock.

In some aspects, the techniques described herein relate to a grip cover, wherein the grip cover prevents the quick release lock from damaging surfaces it collides with.

In some aspects, the techniques described herein relate to a grip cover, wherein the grip cover is further included of a recess grip end surrounding the recess side opening and a ridge grip end surrounding the ridge side opening, and/or wherein the recess grip end and ridge grip end curve inward and have smaller diameters than the grip body.

In some aspects, the techniques described herein relate to a grip cover, wherein the recess grip end is configured to seal a recess end on the quick release lock and the ridge grip end is configured to seal a ridge end on the quick release lock, and/or wherein the sealing of the recess end and the ridge end prevents water or other materials from entering the quick release lock.

In some aspects, the techniques described herein relate to a swivel lock quick release device configured to attach a user to equipment, the swivel lock quick release device including one or more of the following: a stem including a head and an indentation connected to the head, the indentation radially extending about a central axis of the stem, the stem configured to attach to a tether attached to equipment; and a pull release configured to connect to a strap for attaching to a user, the pull release including one or more of the following: a sleeve including a coaxial opening having an inner surface and a groove on the inner surface; a locking body positioned at least partially within the coaxial opening of the sleeve, the locking body including one or more of the following: a recess positioned within the locking body, the recess configured to receive the stem; and a ball housing extending radially through the locking body; a ball positioned within the ball housing; and/or a spring positioned between the sleeve and the locking body, wherein the sleeve is configured to move between a first position and a second position relative to the locking body, wherein the spring biases the sleeve to the first position from the second position, wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body, wherein in the first position, the pull release is configured to swivel relative to the stem by the ball moving in the indentation about the central axis of the stem, and/or wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body.

In some aspects, the techniques described herein relate to a swivel lock quick release device, wherein the locking body includes a flange, the flange including one or more ridges and one or more recesses, wherein a first diameter, to which the ridges extend to, extends to a diameter of the inner surface, and/or wherein a second diameter, to which the recesses extend to, is less than the first diameter, wherein the recesses provide corresponding spaces between the flange and the inner surface to allow for flow of fluid in the spaces between the flange and the inner surface.

In some aspects, the techniques described herein relate to a swivel lock quick release device, wherein the ridges extend to and contact the inner surface to coaxially guide the sleeve relative to the locking body.

In some aspects, the techniques described herein relate to a swivel lock quick release device, wherein the spring presses against the flange of the locking body to bias the sleeve toward the first position relative to the locking body.

In some aspects, the techniques described herein relate to a swivel lock quick release device, wherein the sleeve includes a first ridge on the inner surface, wherein the first ridge presses against the flange in the second position to inhibit further axial movement of the sleeve from the first position to the second position.

In some aspects, the techniques described herein relate to a swivel lock quick release device, wherein the sleeve includes a second ridge on the inner surface, wherein the spring presses against the second ridge of the sleeve to bias the sleeve into the first position relative to the locking body.

In some aspects, the techniques described herein relate to a swivel lock quick release device, wherein the groove is positioned proximate an end of the sleeve.

In some aspects, the techniques described herein relate to a swivel lock quick release device, wherein the groove is positioned at the end of the sleeve.

In some aspects, the techniques described herein relate to a swivel lock quick release device, wherein the locking body includes a channel configured to receive a washer to prevent the sleeve from traveling past the channel, and/or wherein the spring is configured to bias the sleeve to the first position to position the sleeve against the washer in the first position.

In some aspects, the techniques described herein relate to a swivel lock quick release device, further including a junction rod configured to connect the pull release and the strap.

In some aspects, the techniques described herein relate to a swivel lock quick release device, wherein the junction rod includes a first eyelet, and the locking body includes a fastener opening, and/or the junction rod configured to extend into the locking body to position the first eyelet relative to the fastener opening of the locking body for a first fastener to extend into the fastener opening of the locking body through the first eyelet to secure the junction rod to the pull release.

In some aspects, the techniques described herein relate to a swivel lock quick release device, wherein the junction rod includes a second eyelet, and/or the junction rod configured to extend into a strap junction to position the second eyelet relative to a fastener opening of the strap junction for a second fastener to extend into the fastener opening of the strap junction through the second eyelet to secure the junction rod to the strap.

In some aspects, the techniques described herein relate to a swivel lock quick release device, wherein the first eyelet and the second eyelet of the junction rod are positioned perpendicular relative to each other.

In some aspects, the techniques described herein relate to a swivel lock quick release device, wherein the stem includes an eyelet, and/or the stem configured to extend into a guard attachment of the tether to position the eyelet of the stem relative to a fastener opening of the guard attachment for a third fastener to extend into a fastener opening of the guard attachment through the eyelet of the stem to secure the stem to the tether.

In some aspects, the techniques described herein relate to a swivel lock quick release device, wherein the ball housing includes a lip extending into the ball housing, the lip having a smaller perimeter than a diameter of the ball, and/or the lip configured to inhibit inward radial movement of the ball into the recess out of the ball housing.

In some aspects, the techniques described herein relate to a swivel lock quick release device configured to attach a user to equipment, the swivel lock quick release device including one or more of the following: a stem configured to attach to a tether attached to equipment; and a pull release configured to connect to a strap for attaching to a user, the pull release including one or more of the following: a slide handle including an inner cylindrical surface; a locking body positioned at least partially within the inner cylindrical surface of the slide handle, the locking body including one or more of the following: a recess positioned within the locking body on a first end of the locking body, the recess configured to receive the stem, wherein the pull release is configured to swivel relative to the stem in the recess; and a protruding head positioned proximate to a second end of the locking body relative to the first end, the first end opposite the second end, the protruding head including one or more ridges and one or more recesses, wherein a first diameter, to which the ridges extend to, extends to a surface diameter of the inner cylindrical surface, and wherein a second diameter, to which the recesses extend to, is less than the first diameter, wherein the recesses provide corresponding spaces between the protruding head and the inner cylindrical surface to allow for flow of fluid in the spaces between the protruding head and the inner cylindrical surface; and/or a spring positioned between the slide handle and the locking body, and/or wherein the slide handle is configured to move between a first position and a second position relative to the locking body, wherein the spring biases the slide handle to the first position from the second position, wherein the locking body is configured to secure the stem within the recess with the slide handle in the first position and is configured to allow the stem to exit the recess with the slide handle in the second position.

In some aspects, the techniques described herein relate to a swivel lock quick release device, wherein the slide handle is configured to be pulled in a coaxial direction toward the user to disengage the stem from the pull release.

In some aspects, the techniques described herein relate to a swivel lock quick release device, wherein the ridges and recesses of the protruding head are disposed uniformly around the protruding head.

In some aspects, the techniques described herein relate to a swivel lock quick release device, further including a first securing bit configured to secure the pull release to the strap, wherein the first securing bit may be removed and reinstalled to facilitate the attachment of different straps to the swivel lock quick release device.

In some aspects, the techniques described herein relate to a swivel lock quick release device, further including a second securing bit configured to secure the stem to the tether, wherein the second securing bit may be removed and reinstalled to facilitate the attachment of different tethers to the swivel lock quick release device.

In some aspects, the techniques described herein relate to a swivel lock quick release device adapted to selectively attach a user to equipment, the swivel lock quick release device including one or more of the following: a stem configured to attach to a tether attached to equipment; and a pull release configured to connect to a strap for attaching to a user, the pull release including one or more of the following: a slide handle; a locking body configured to axially move relative to the slide handle, the locking body including one or more of the following: a recess positioned within the locking body on a first end of the locking body, the recess configured to receive the stem, wherein the pull release is configured to swivel relative to the stem; and a channel positioned proximate to a second end of the locking body relative to the first end, the first end opposite the second end, the channel configured to receive a washer to prevent the slide handle from traveling past the channel; and/or a spring positioned between the slide handle and the locking body, wherein the slide handle is configured to move between a first position and a second position relative to the locking body, wherein the spring is configured to bias the slide handle to the first position from the second position against the washer, and/or wherein the locking body is configured to secure the stem within the recess with the slide handle in the first position and is configured to allow the stem to exit the recess with the slide handle in the second position.

In some aspects, the techniques described herein relate to a swivel lock quick release device, wherein the washer includes a central locking shape and the channel includes an inner surface, and/or the central locking shape corresponds to the shape of the inner surface of the channel.

In some aspects, the techniques described herein relate to a swivel lock quick release device, wherein the central locking shape and the shape of the inner surface of the channel are circles.

In some aspects, the techniques described herein relate to a swivel lock quick release device, wherein the washer includes a base and two arms, the arms each including a gripping surface.

In some aspects, the techniques described herein relate to a lock quick release device adapted to selectively attach a user to equipment, the lock quick release device including one or more of the following: a protrusion configured to attach to a tether attached to equipment; a pull release configured to attach to a strap for attaching to a user, the pull release including one or more of the following: a slide handle; and a locking component including a recess positioned within the locking component, the recess configured to receive the protrusion, wherein the pull release is configured to rotate around the protrusion; a spring positioned between the slide handle and the locking component, wherein the slide handle is configured to move between a first position and a second position relative to the locking component, wherein the spring biases the slide handle to the first position from the second position, wherein the locking component is configured to secure the protrusion within the recess with the slide handle in the first position and is configured to allow the protrusion to exit the recess with the slide handle in the second position; a junction rod; and/or a first fastener, a second fastener, and a third fastener, and/or wherein: the first fastener configured to connect the locking component and the junction rod; the second fastener configured to connect the protrusion and the tether; and/or the third fastener configured to connect the junction rod and the strap.

In some aspects, the techniques described herein relate to a lock quick release device, further including a removable pull release stopper disposed on the locking component, wherein removing the pull release stopper from the locking component allows the slide handle to disassemble from the locking component, and/or wherein disassembly of the slide handle from the locking component allows for removal of the first fastener.

In some aspects, the techniques described herein relate to a lock quick release device, wherein the second fastener is configured to be removed and reinstalled to facilitate the attachment of different tethers to the protrusion.

In some aspects, the techniques described herein relate to a lock quick release device, wherein the third fastener is configured to be removed and reinstalled to facilitate the attachment of different straps to the pull release.

In some aspects, the techniques described herein relate to a lock quick release device, further including a grip cover, the grip cover including one or more of the following: a grip body having a cylindrical shape; a ridge side opening disposed on one end of the grip body; a recess side opening disposed on an opposite end of the grip body; a grip ridge secured between the grip body and the ridge side opening; and/or an internal ridge nested within the grip body; wherein the grip body is configured to cover the pull release.

In some aspects, the techniques described herein relate to a lock quick release device, wherein the grip ridge is configured to secure a grip on the pull release to improve engagement between the grip cover and said pull release.

In some aspects, the techniques described herein relate to a lock quick release device, wherein the internal ridge is configured nest within a ridge slot on the pull release to improve engagement between the grip cover and the pull release.

In some aspects, the techniques described herein relate to a lock quick release device, wherein the grip cover includes a buoyant material, and/or wherein the buoyant material of the grip cover is configured to facilitate floatation of the lock quick release device in water.

In some aspects, the techniques described herein relate to a lock quick release device, wherein the grip cover further includes a recess grip end surrounding the recess side opening and a ridge grip end surrounding the ridge side opening, and/or wherein the recess grip end and ridge grip end curve inward and have smaller diameters than the grip body.

In some aspects, the techniques described herein relate to a lock quick release device, wherein the recess grip end is configured to seal a recess end on the lock quick release device and the ridge grip end is configured to seal a ridge end on the lock quick release device, and/or wherein the sealing of the recess end and the ridge end prevents water or other materials from entering the lock quick release device.

In some aspects, the techniques described herein relate to a swivel lock quick release device configured to attach a user to equipment, the swivel lock quick release device including one or more of the following: a stem including a head and an indentation connected to the head, the stem configured to attach to one of equipment or a user; and a pull release configured to connect to the other of the equipment or the user, the pull release including one or more of the following: a sleeve including a coaxial opening having an inner surface and a groove on the inner surface; a locking body positioned at least partially within the coaxial opening of the sleeve, the locking body including one or more of the following: a recess positioned within the locking body, the recess configured to receive the stem; and a ball housing extending radially through the locking body; a ball positioned within the ball housing; and/or a spring positioned between the sleeve and the locking body, wherein the sleeve is configured to move between a first position and a second position relative to the locking body, wherein the spring biases the sleeve toward the first position, wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body, wherein in the first position, the pull release is configured to swivel relative to the stem by the ball moving in the indentation about a central axis of the stem, wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body, and/or wherein attachment to the equipment or the user is via a threaded connection.

In some aspects, the techniques described herein relate to a swivel lock quick release device, wherein stem is connected to an eyelet or a shackle configured to connect to the one of the equipment or the user.

In some aspects, the techniques described herein relate to a swivel lock quick release device, wherein pull release is connected to an eyelet or a shackle configured to connect to the other of the equipment or the user.

In some aspects, the techniques described herein relate to a system for selectively attaching a user to a sports equipment including one or more of the following: a tether adapted to attach to the sports equipment; a strap adapted to attach to a user; a protrusion attached to the strap, the protrusion having an indentation; a pull release attached to the tether, the pull release having: a slide handle having a groove; a plurality of balls adapted to move between the indentation on the protrusion and the groove; a locking component having: a recess extending inside the locking component, the recess being configured to receive the protrusion; a housing for the plurality of balls, the housing being adapted to allow the plurality of balls to engage with the indentation in the protrusion; and/or a spring disposed between the slide handle and the locking component, wherein the pull release has a first position and a second position, the first position being when the spring is in a normal state and the plurality of balls engage with the protrusion, the second position being when the spring is compressed, and the plurality of balls engage with the groove, and/or wherein the pull release is adapted to rotate around the protrusion.

In some aspects, the techniques described herein relate to a swivel lock quick release device, wherein the strap is an ankle strap.

In some aspects, the techniques described herein relate to a swivel lock quick release device, wherein the plurality of balls consists of four balls.

In some aspects, the techniques described herein relate to a swivel lock quick release device, wherein the sports equipment is a surfboard.

In some aspects, the techniques described herein relate to a swivel lock quick release device, further including a tether protector adapted to form a more secure connection between the pull release and the tether.

In some aspects, the techniques described herein relate to a swivel lock quick release device, wherein the strap has a hook-and-loop fastener.

In some aspects, the techniques described herein relate to a swivel lock quick release device, wherein the swivel lock quick release device has a pull release stopper adapted to stop the pull release from extending past the locking component.

In some aspects, the techniques described herein relate to a swivel lock quick release device, wherein the sports equipment is a kite surfing equipment.

In some aspects, the techniques described herein relate to a swivel lock quick release device, wherein the strap is a wrist strap.

In some aspects, the techniques described herein relate to a swivel lock quick release device, wherein the tether is adapted to rotate.

In some aspects, the techniques described herein relate to a swivel lock quick release device including one or more of the following: a protrusion adapted to engage with a pull release, the protrusion having an indentation adapted to hold a plurality of balls; the pull release having: a spring; a slide handle having a groove; the plurality of balls being adapted to move between being engaged with the groove and the protrusions; a locking component, the locking component having: a recess extending inside the locking component, the recess being configured to receive the protrusion when the protrusion slides into the pull release; and/or a plurality of ball housing adapted to allow the plurality of balls to engage with the indentation in the protrusion the spring is disposed between the slide handle and the locking component, and/or wherein the pull release has a first position and a second position, the first position being the spring expanded and the plurality of balls engaged with the protrusion, the second position being the spring compressed and the plurality of balls engaged with the groove.

In some aspects, the techniques described herein relate to a swivel lock quick release device, wherein each of the plurality of ball housings has a ball housing edge adapted to prevent each of the plurality of balls from falling inward into the recess.

In some aspects, the techniques described herein relate to a swivel lock quick release device, wherein the slide handle has an exterior textured grip.

In some aspects, the techniques described herein relate to a swivel lock quick release device adapted to selectively attach a user to a sports equipment, the device including a first connector and a second connector, the first and second connector being adapted to be selectively engaged in a locked position, and/or a portion of the first connector being adapted to be selectively moved in a coaxial direction by the user to disengage the first and second connector.

In some aspects, the techniques described herein relate to a swivel lock quick release device, wherein the first connector includes: a spring disposed between a slide handle and a locking component; a cam adapted to move between being engaged and disengaged with a protrusion of the second connector; and/or a shaft and a spring wire adapted to attach the cam to the locking component, wherein the shaft and spring wire are adapted to allow the cam to pivotally engage and disengage the protrusion.

In some aspects, the techniques described herein relate to a swivel lock quick release device, wherein the locking component having a recess extending inside the locking component, and/or the recess being configured to receive the protrusion when the protrusion slides into the first connector.

In some aspects, the techniques described herein relate to a swivel lock quick release device, wherein the first connector has a first position and a second position, the first position being the spring expanded and the cam engaged with the protrusion, and/or the second position being the spring compressed and the cam disengaged with the protrusion.

In some aspects, the techniques described herein relate to a swivel lock quick release device, wherein the second connector includes a protrusion having an indentation, and/or the protrusion being adapted to be inserted into the recess of the first connector.

In some aspects, the techniques described herein relate to a swivel lock quick release device, wherein the first connector has a pull release stopper adapted to stop the pull release from extending past the locking component.

In some aspects, the techniques described herein relate to a system for selectively attaching a user to a sports equipment including one or more of the following: a tether having a first and second end, the first end being adapted to attach to the sports equipment; a strap adapted to attach to the user; a first connector adapted to attach to the second end of the tether; a second connector adapted to attach to the strap; and/or the first and second connector being adapted to be selectively engaged in a locked position, a portion of the first connector being adapted to be selectively moved in a coaxial direction by the user to disengage the first and second connector.

In some aspects, the techniques described herein relate to a swivel lock quick release device adapted to selectively attach a user to a sports equipment, the swivel lock quick release device including one or more of the following: a tether adapted to attach to said sports equipment; a strap adapted to attach to a user; a protrusion attached to the tether, the protrusion having an indentation; a pull release attached to the strap, the pull release having: a slide handle including one or more of the following: a grip a ridge slot; a locking component having: a recess nested within the locking component, the recess being configured to receive the protrusion; and a spring disposed between the slide handle and the locking component; wherein the pull release has a first position and a second position, the first position being when the spring is in a normal, uncompressed state, the second position being when the spring is compressed; and/or a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and/or an internal ridge nested within the grip body, wherein the strap is configured to be selectively coupled to the tether, such that the user may be selectively coupled to the sports equipment, wherein the grip body is configured to cover the pull release on a swivel lock quick release device, wherein the grip ridge is configured to cover and engage with the grip on the slide handle and the internal ridge is configured to nest within the ridge slot of the slide handle, and/or wherein the pull release is adapted to rotate around the protrusion.

In some aspects, the techniques described herein relate to a swivel lock quick release device, wherein the slide handle is configured to be pulled in a coaxial direction toward the user to disengage the protrusion from the pull release.

In some aspects, the techniques described herein relate to a swivel lock quick release device, wherein the pulling of the slide handle toward the user is easier to do than pulling the slide handle away from the user as a result of the swivel lock quick release device being compressed between the user and their hand when pulling the slide release toward the user.

In some aspects, the techniques described herein relate to a swivel lock quick release device, further including a first securing bit configured to secure the pull release to the strap and a second securing bit configured to secure the protrusion to the tether.

In some aspects, the techniques described herein relate to a swivel lock quick release device, wherein the first securing bit may be removed and reinstalled to facilitate the attachment of different straps to the swivel lock quick release device.

In some aspects, the techniques described herein relate to a swivel lock quick release device, wherein the second securing bit may be removed and reinstalled to facilitate the attachment of different tethers to the swivel lock quick release device.

In some aspects, the techniques described herein relate to a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and/or wherein the grip cover is configured to cover a swivel lock quick release device, said swivel lock quick release device including one or more of the following: a first connector; and/or a second connector, wherein the first and second connector are configured to be selectively engaged in a locked position, a portion of the first connector being adapted to be selectively moved in a coaxial direction by the user to disengage the first and second connector, such that the first connector and second connector may be selectively coupled to each other; and wherein the grip body is configured to cover the first connector of a swivel lock quick release device and the grip ridge is configured to engage with the first connector.

In some aspects, the techniques described herein relate to a grip cover, wherein the grip cover is further included of a recess grip end surrounding the recess side opening and a ridge grip end surrounding the ridge side opening, and/or wherein the recess grip end and ridge grip end curve inward and have smaller diameters than the grip body.

In some aspects, the techniques described herein relate to a grip cover, wherein the recess grip end is configured to seal a recess end on the first connector and the ridge grip end is configured to seal a ridge end of the first connector, and/or wherein the sealing of the recess end and the ridge end prevents water or other materials from entering the swivel lock quick release device.

In some aspects, the techniques described herein relate to a grip cover, wherein the first connector is a pull release, and/or the pull release is configured to attach to a strap.

In some aspects, the techniques described herein relate to a grip cover, wherein the second connector is a protrusion, and/or the protrusion is configured to attach to a tether.

In some aspects, the techniques described herein relate to a grip cover including one or more of the following: a grip body having a regular cylindrical shape; a ridge side opening disposed on one end of the grip body; a recess side opening disposed on an opposite end of the grip body; a grip ridge secured between the grip body and the ridge side opening; and/or an internal ridge nested within the grip body, and/or wherein the grip body is configured to cover a pull release on a quick release lock.

In some aspects, the techniques described herein relate to a grip cover, wherein the grip ridge is configured to secure a grip on the quick release lock to improve engagement between the grip cover and said quick release lock.

In some aspects, the techniques described herein relate to a grip cover, wherein the internal ridge is configured nest within a ridge slot on the pull release to improve engagement between the grip cover and the quick release lock.

In some aspects, the techniques described herein relate to a grip cover, wherein the grip cover is made of a buoyant material, and/or wherein the buoyant material of the grip cover is configured to make the quick release lock float to make said quick release lock easier to find while submerged.

In some aspects, the techniques described herein relate to a grip cover, wherein the grip cover prevents a user from being injured through collision with quick release lock.

In some aspects, the techniques described herein relate to a grip cover, wherein the grip cover prevents the quick release lock from damaging surfaces it collides with.

In some aspects, the techniques described herein relate to a grip cover, wherein the grip cover is further included of a recess grip end surrounding the recess side opening and a ridge grip end surrounding the ridge side opening, and/or wherein the recess grip end and ridge grip end curve inward and have smaller diameters than the grip body.

In some aspects, the techniques described herein relate to a grip cover, wherein the recess grip end is configured to seal a recess end on the quick release lock and the ridge grip end is configured to seal a ridge end on the quick release lock, and/or wherein the sealing of the recess end and the ridge end prevents water or other materials from entering the quick release lock.

Methods of using the system(s) (including device(s), apparatus(es), assembly(ies), structure(s), and/or the like) disclosed herein are included; the methods of use can include using or assembling any one or more of the features disclosed herein to achieve functions and/or features of the system(s) as discussed in this disclosure. Methods of manufacturing the system(s) disclosed herein are included; the methods of manufacture can include providing, making, connecting, assembling, and/or installing any one or more of the features of the system(s) disclosed herein to achieve functions and/or features of the system(s) as discussed in this disclosure.

This Summary is provided to introduce a selection of concepts in a simplified form that are further described below in the Detailed Description. This Summary is not intended to identify key aspects or essential aspects of the claimed subject matter.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 7A illustrates a perspective view of an exemplary embodiment of a grip cover for sports equipment tethers, according to an aspect.

FIG. 7B illustrates the perspective view of the swivel lock quick release device, according to an aspect.

FIG. 13A illustrates a top view of an alternatively configured swivel lock with a grip cover, according to an aspect.

FIG. 13B illustrates a side view of an alternatively configured swivel lock with a grip cover, according to an aspect.

FIG. 13C illustrates a perspective view of an alternatively configured swivel lock with a grip cover, according to an aspect.

FIG. 14A illustrates the side perspective view of two different configurations of the disclosed swivel lock quick release device, according to an aspect.

FIG. 14B illustrates the side perspective view a first configuration of the swivel lock quick release device, according to an aspect.

FIG. 14C illustrates the perspective view of a second configuration of the swivel lock quick release, according to an aspect.

DETAILED DESCRIPTION

Figure 1:
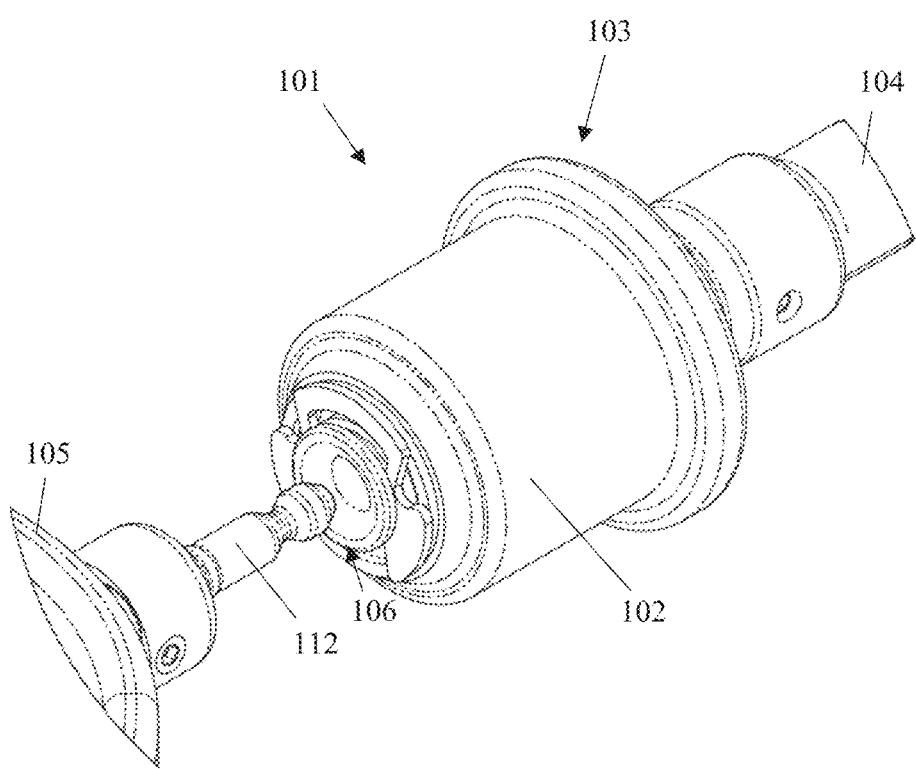
FIG. 1 illustrates the perspective view of the swivel lock quick release device, according to an aspect.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

For the following description, it can be assumed that most correspondingly labeled elements across the figures (e.g., 105 and 205, etc.) possess the same characteristics and are subject to the same structure and function.

FIG. 1 illustrates the perspective view of the swivel lock quick release device 101, according to an aspect. The swivel lock quick release device 101 may be adapted to selectively attach a user to a floatation device (not shown) or a piece of sports equipment. The floatation device may be watersports equipment, such as a surfboard, a stand-up paddle board, a kite surfing harness, a fishing rod and reel, a wake board, etc. The swivel lock quick release device 101 can be used in other applications where a quick release of the user is desired from the equipment or object, such as from a sailboat in sailing applications or a rifle in hunting applications.

The swivel lock quick release device 101 having a first connector 102 and a second connector 112 is provided. The first connector 102 may be a pull release 102 and the second connector 112 may be a protrusion, stem, or pole 112. The pull release 102 and protrusion 112 may be selectively engaged in a locked position as described hereinbelow. A slide handle, a portion of the pull release 102, may be adapted to be selectively moved in a coaxial direction (e.g., coaxial with the swivel lock) by the user to disengage the pull release and the protrusion. The pull release 102 may also be adapted to rotate around the protrusion 112 when connected, allowing the swivel lock device 101 to swivel. Additionally, the swivel lock quick release device 101 may be attached to a tether 104 and a strap 105, as shown in FIG. 1. The tether 104 may be adapted to attach to the floatation device, while the strap 105 may be adapted to attach to the user. This connection between the pull release 102 and a protrusion 112 may allow the user to first lock themself to the athletic equipment, and then quickly and reliably disengage themselves from said equipment, for example, in dangerous situations. Having a reliable locking tether that swivels and functions with a quick and reliable means to disengage while participating in aquatic and or land athletics, sports, or other activities is critical due to the need to not only be safely fastened to the object but the need to quickly and safely release from the object because of possible scenarios, dangerous or otherwise, a user may encounter, enjoy, or benefit from.

As described herein, sports, aquatic and land activities, can be dangerous because of the lack of quick release options in those dangerous situations. Currently, users who participate in watersports, for example, are at a risk when using a tether to keep them attached to their board, flotation device, or sporting equipment because of the common occurrences of the tether becoming tangled with other objects in the body of water or failure of other equipment involved in the activity. Another typical dangerous scenario is the user and the board going in different directions around large objects at high speeds. Additionally, another common dangerous situation is if the user is held under the water because of turbulence and heavy water in large surf or when the tether attaches to rock, macroalgae, or coral in the body of water. These tethers pose the problem of keeping the user attached even if it is a dangerous situation. For example, turbulent water may be keeping the board submerged and in turn the attached user. Furthermore, the swivel lock quick release device 101 may be used for other sports equipment such as surfing, fishing, stand-up paddling, sailing, hunting, animal collars, or kite surfing equipment.

The swivel lock quick release device allows a user to easily disengage themselves from a tether 104, especially during critical situations. The pull release 102 may have a textured surface for the grip 103 to allow the user to have a better grasp when they need to disengage themselves from the tether. The grip 103 may be patterned, in an example, but other means of textured grip may also be applied to the pull release 102. The user may need to disengage themselves from the tether in situations such as the tide pulling the board down, harsh waters, and other dangerous situations that may occur in bodies of water, on land, or for other activities that require a secure locking attachment and an option of quick releasing. Thus, having a pull release 102 that has a textured grip 103 and is large enough to be visible and easily accessible from a 360-degree integrated cylinder gripped slide handle during high stress or emergency situations is critical.

As shown, the user may wrap the strap 105 around their ankle to have the security of being attached to their board via a tether 104, but the swivel lock quick release device 101 allows the user to disengage when necessary. The swivel lock quick release device 101 may have a swivel mechanism 106, which may allow the user to not get tangled with the tether 104. The swivel mechanism 106 will be discussed in more detail when referring to FIGS. 3A-3D.

Furthermore, the swivel lock quick release device 101 is adapted to selectively attach a user to a sports equipment. The sports equipment may be watersports equipment, such as a surfboard, a stand-up paddle board, a kite surfing harness, sailing safety gear, a wake board, etc., or land sports equipment, such as fishing, technical rifle gear, climbing, camping, and hunting equipment.

Figure 2:
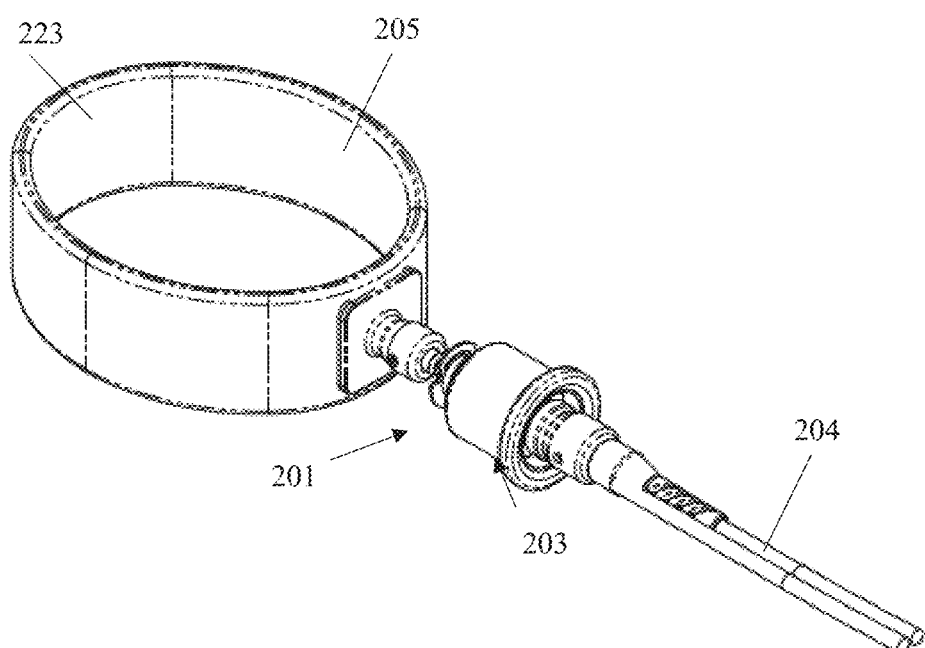
FIG. 2 illustrates the front perspective view of the swivel lock quick release device attached to an attachable strap, according to an aspect.

FIG. 2 illustrates the perspective view of the swivel lock quick release device 201 attached to an attachable strap 205, according to an aspect. In some aspects, the strap 205 has a hook and loop fastener 223 to secure around the user, as shown. For example, the hook and loop fastener 223 may be Velcro. Additionally, the strap 205 may be wrapped around a different appendage of the user, for example, their wrist, calf, chest, or ankle. The disengagement of the swivel lock quick release device 201 has to be as fast as possible and reliable in critical or emergency situations because these situations usually require a fast reaction time. The swivel lock quick release device 201 would be easy to reach and spot in the water because of the larger grip 203. For example, this is even more important in dangerous situations such as turbulent waters, white water, and other situations where visibility is reduced. The grip 203 ensures faster and more reliable release, which in critical situations is advantageous to help save the user from injury or death. It should be understood that the engaging and disengaging of the swivel lock quick release device 201 may also be referred to as "coupling" and "uncoupling", respectively, as will be described in greater detail hereinbelow.

Figure 3A:
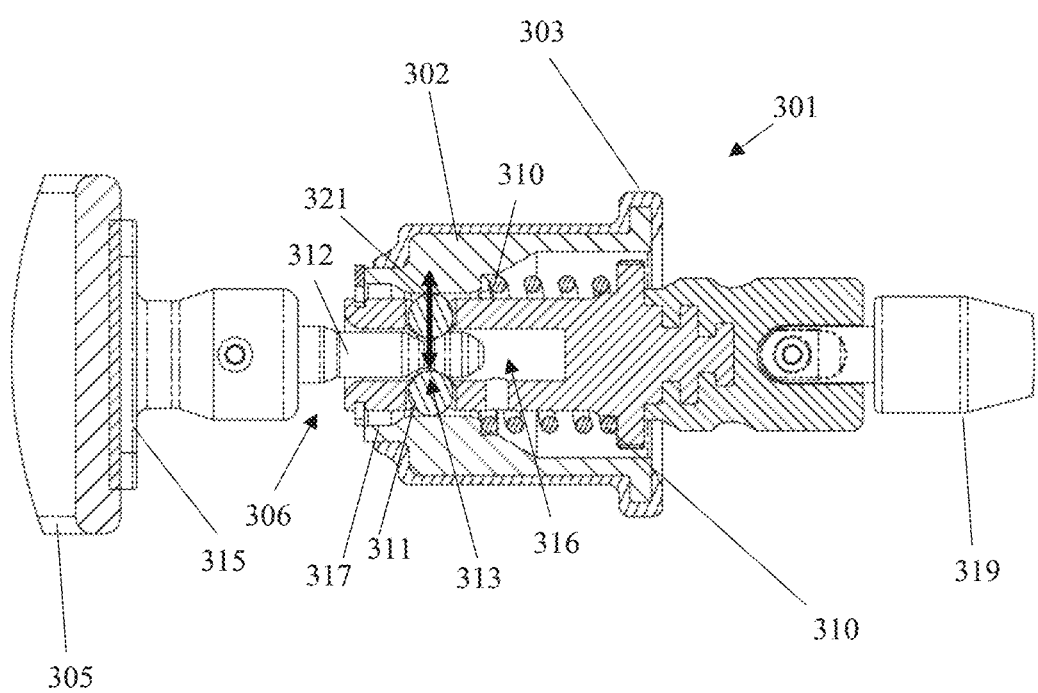
FIG. 3A illustrates the cross-sectional perspective view of the swivel lock quick release device in a locked position, according to an aspect.

FIG. 3A illustrates the cross-sectional view of the swivel lock quick release device in the locked position, according to an aspect. For example, the grip 303 may have a series of protrusions to allow the user to have a better grasp on the pull release 302. In another example, the grip 303 may be in an ergonomic shape with grooves for the user's fingers. Furthermore, the connection between the tether 204 and the swivel lock quick release device 301 may utilize a guard 319 to create a stronger connection and provide better durability against wear and tear of repeated use of the tether 204 connected to the guard 319.

Additionally, the combination of the protrusion 312 and pull release 302 allows the user to reuse their strap 305 with any number of variable tethers they have previously connected to their floatation devices, animals, or other sporting equipment. For example, the user may purchase multiple tethers, differentiated by size, length, and composition, with the pull release and attach them to their various equipment while using a single strap 305 with the protrusion 312 to connect to each pull release 302. This allows the user to interchange their equipment and tethers 204 without needing a new strap 305 for each device or a detached locking pin, key, or object. Moreover, it is convenient for the user to not have to buy a set of both a tether 204 and a strap 305 for each sporting tether device they have.

The protrusion 312 may be held into place by one or a plurality of balls (e.g., ball bearings) 311. The swivel mechanism 306 of the swivel lock quick release device allows the pull release 302 to rotate around the protrusion 312. The rotation of the pull release 302 around the protrusion 312 prevents the tether from becoming tangled around the user, the floatation device, or obstacles while in use and allows, when locked, for the tether to be securely fastened without trepidation of accidental or unintentional disengagement.

Moreover, the grip 303 of the pull release 302 in combination with the spring 310 stiffness allows the user to easily and reliably disengage from their floatation device, animals, or sporting equipment. The spring 310 would have an appropriate stiffness to ensure the spring 310 does not accidently release during sporting activities but would still allow the user's force to disconnect the pull release 302 from the protrusion 312. It should be understood the spring 310 should have the right stiffness such that to not prematurely or accidently release. Additionally, the spring stiffness would still allow the user to disconnect the pull release 302 from the protrusion 312 with one hand. A single hand disconnection is advantageous, for example, because the user may be paddling with the other hand. Furthermore, this disconnection has to be quick and easy because of, for example, the unpredictability of dangerous situations in watersports. It offers the ability for the user to reattach the tether with one hand and without the need to reintroduce an additional disengaged or disconnected locking object, such as a pin, or a key.

Furthermore, the protrusion 312 of the swivel lock quick release device 301 allows the pull release 302 to be locked into place, as described herein. The protrusion 312 would be inserted into the protrusion housing 316, which may be cylindrical, within the pull release 302 as shown. The insertion of the protrusion 312 into the pull release 302 allows for the selective coupling and uncoupling of the correspondingly attached strap 305 and tether, as will be discussed in greater detail hereinbelow. The pull release 302 and the protrusion 312 are locked together by an indentation 313 on the protrusion 312 and balls 311. The indentation 313 forms a head, tip, or bulb 323 on the end of the protrusion 312. The balls 311 protrude from the pull release 302 and rest inside the protrusion indentation 313. This allows the pull release 302 and the protrusion 312 to be engaged and stay connected when the user desires it. The ball 311, as shown, is held within a ball housing, opening, radial opening, or hole 318, which will be discussed in more detail when referring to FIG. 3B. The ball housing 318 allows the ball to radially move in and out of the protrusion indentation 313, as depicted by the arrow 321, and ensures the locking device, once closed, is secured on the protrusion.

Additionally, the connection between the tether 204 and the swivel lock quick release device 301 may have a guard 319 to create a stronger connection and provide better durability against wear and tear of repeated use. As shown, the protrusion 312 faces away from the user on the attachment strap 305. This allows the user to attach the pull release device 302 the protrusion 312 whenever needed.

Figure 3B:
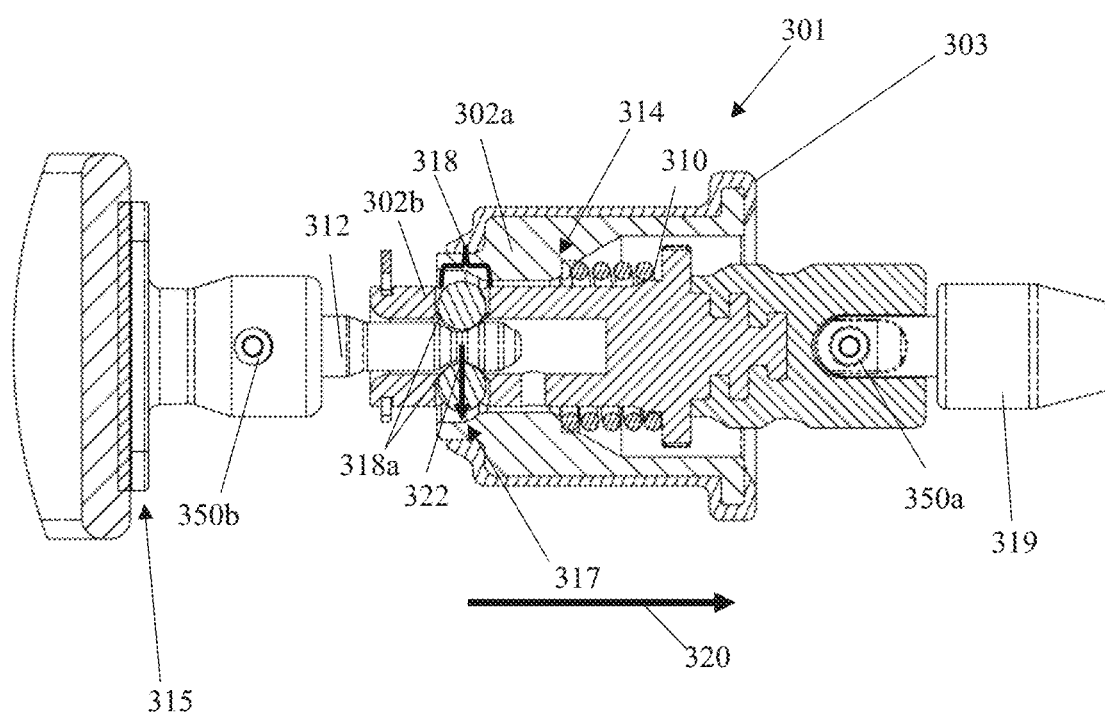
FIG. 3B illustrates the cross-sectional view of the swivel lock quick release device in a partially locked position, according to an aspect.

FIG. 3B illustrates the cross-sectional view of the swivel lock quick release device 301 in a partially locked position, according to an aspect. As shown, the slide handle, cylinder, or sleeve 302a is in a second coaxial position, which may allow the balls 311 to move into the ball groove 317. The ball groove 317 may allow the balls 311 to disengage with the pin 312 and allow the pull release 302 to detach from the user, which will be described in more detail when referring to FIG. 3C. For example, the swivel lock quick release device 301 may have a hole in the recess 325 used by the protrusion 312 to allow water and particulates to pass through the device 301, which may prevent blockage or hydraulic jamming of the system. The protrusion housing 316 may exist as part of the recess, opening, cavity, 325, in which the protrusion 312 is secured to facilitate the attachment of the pull release 302 to the protrusion 312.

As shown, the spring 310 may be a continuous spring surrounding the locking portion, component, tube, or body 302b of the pull release 302. In another example, the spring 310 may be multiple smaller springs. Furthermore, the pull release 302 is disconnected by a unidirectional, motion, shown by arrow 320 that is coaxial with the pull release 302 swivel lock 301. The user can apply force in this direction 320 to facilitate their disengagement from the tether. This allows the user to have a reliable way to disconnect, along with a faster way to disconnect. The coaxial and linear motion of the pull release 302 being disconnected from the protrusion 312 allows for the reliable disconnection during critical times.

Additionally, the ball housing 318, where the ball(s) 311 are contained, may have a small edge or lip (ball housing edge or lip) 318a at the innermost region, preventing the balls 311 from falling inward into the recess 325 used by the protrusion 312. Moreover, for the user to attach to the tether 204, the slide handle 302a may be pulled back against the spring 310, allowing the balls 311 to move outward radially as the protrusion 312 is inserted. This may allow sufficient room for the protrusion 312 to be inserted to a depth where the balls 311 are then able to radially translate inward as the slide handle 302a slides over the ball housings 318.

Figure 3C:
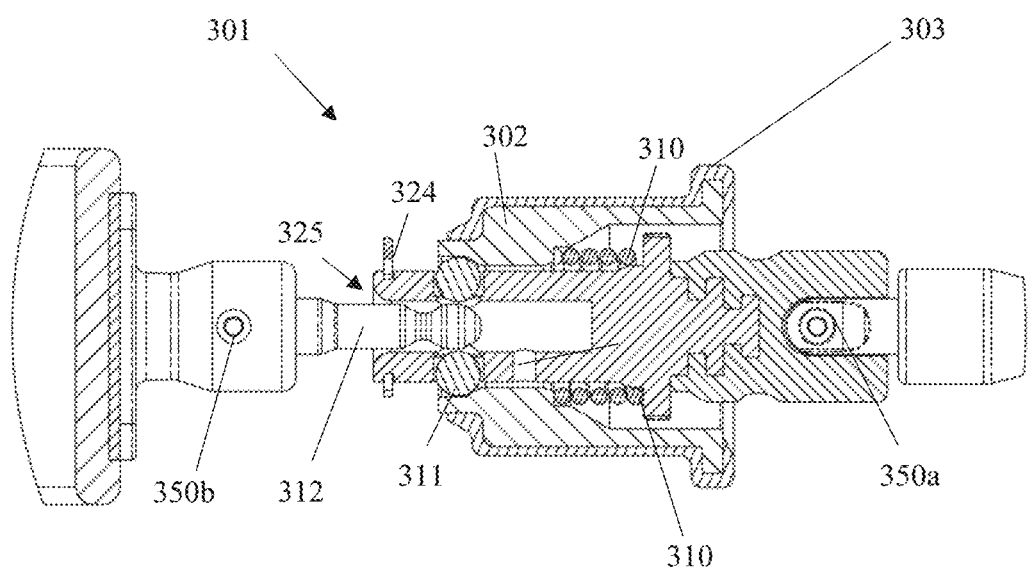
FIG. 3C illustrates the cross-sectional view of the swivel lock quick release device in a partially unlocked position, according to an aspect.

FIG. 3C illustrates the cross-sectional view of the swivel lock quick release device in a partially unlocked position, according to an aspect. As shown, when the swivel lock quick release device 301 is pulled, the ball indentation 313 in the protrusion 312 is aligned with the balls 311. This allows the balls in the ball housing 318 to release the protrusion 312. The spring 310 allows the pull release 302 to compress, which allows the ball groove 317 to be aligned with the balls. Once the spring 310 is compressed and the pull release 302 shifts backwards, as depicted by the arrow 320, the balls 311 may move into the ball groove 317. When the ball 311 moves radially outward into the ball groove 317, as depicted by the arrow 322 in FIG. 3B, the balls 311 release the protrusion 312, which allows the pull release 302 and the protrusion 312 to disengage.

As shown, the pull release 302 may have two components, a slide handle 302a and a locking component 302b. As described herein, the slide handle 302a may have a groove 317 to allow the ball 311 to disengage from the protrusion 312. The locking component 302b may have a recess 325 extending inside (e.g., nested within) the locking component 302b and the recess 325 may be configured to receive the protrusion 312. The locking component 302b may also have a housing 318 for the balls 311, wherein the housing 318 may be adapted to allow the balls 311 to engage with the indentation 313 in the protrusion 312, which would create a locked position. Additionally, the balls 311 would be adapted to move between the indentation 313 on the protrusion 312 and the groove 317 to allow the pull release 302 to disengage from the protrusion 312 when the balls 311 are in the groove 317. The pull release 302 would also have a spring 310 disposed between the slide handle 302a and the locking component 302b, which would allow the pull release 302 to have a first and second position. The pull release's first position is shown by FIG. 3A, and the second position is shown by FIG. 3C. The first position being when the spring is in a normal, uncompressed state and the balls 311 engage with the protrusion 312, and the second position being when the spring 310 is compressed, and the plurality of balls 311 engage with the groove 317.

Furthermore, the swivel lock quick release device 301 may have a tether joint 350a where the device attaches to the tether 204. The tether joint 350a may further allow the device 301 to swivel and rotate as needed during use. Additionally, a strap joint 350b may be disposed between the protrusion 312 and strap junction 315 to further enable the swiveling and rotation of the swivel lock 301 from the strap 305 side of the said swivel lock 301.

Figure 3D:
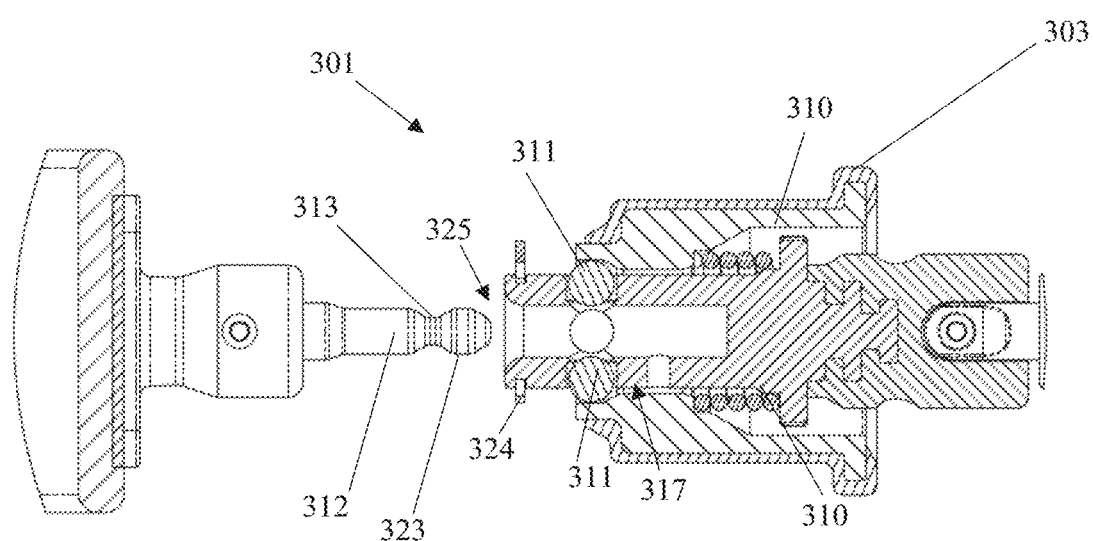
FIG. 3D illustrates the cross-sectional view of the swivel lock quick release device in an unlocked position, according to an aspect.

FIG. 3D illustrates the cross-sectional view of the swivel lock quick release device, in an unlocked position according to an aspect with the protrusion out of or exited from the recess 325. As described herein, once the user engages the pull release 302, they will be separated from their tether 204, which allows them to maneuver without being attached to their board. As shown in FIGS. 3A-3D, the user may pull on the pull release 302 to disconnect the strap 305 from the tether 204. Being able to disengage from the tether 204 allows the user to avoid dangerous situations. It is common for tethers to become tangled because of their rigid connection points. Also shown in FIG. 3D, the swivel lock quick release device 301 may have a pull release stopper 324 adapted to stop the slide handle 302a from traveling past the locking component 302b. The pull release stopper 324 prevents the pull release 302 from disassembling and assures the balls 311 are contained within their ball housing 318 to grip the protrusion 312.

As shown in FIGS. 3A-3D, the swivel lock quick release device 301 may be engaged and disengaged by having the user pulling and pushing on the pull release 302. The swivel lock quick release device 301 may be locked into place with the protrusion 312 engaged with the balls, as shown in FIG. 3A. If the user desires to disengage the tether 204 from the strap 305 they may pull on the pull release 302, which compresses the springs 310 with the spring ledge 314. As shown, the strap 305 may have a hook-and-loop fastener to secure around the user's appendage, although the strap 305 may secure around the user's appendage by other means for example a snap in button.

For example, the indentations 313 may be individual indentations along the upper portion of the protrusion. In another example, the indentation 313 may be a single indentation around the circumference of the protrusion 312.

The protrusion 312 may be embedded in a strap junction 315 as shown. The strap junction 315 may allow the attached protrusion 312 to be better supported and may ensure it is durable during activity.

Figure 4A:
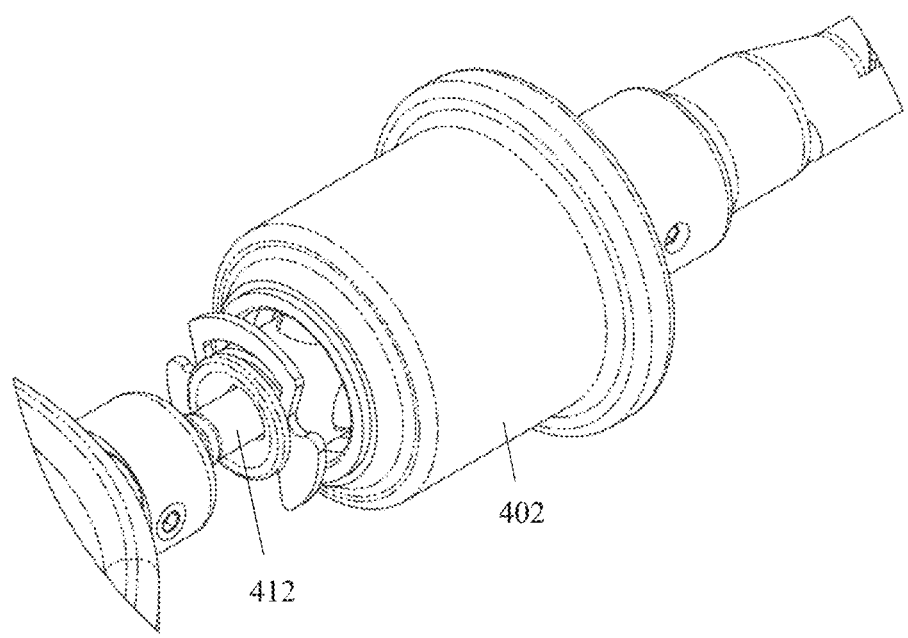
FIG. 4A illustrates the perspective view of the swivel lock quick release device in a locked position, according to an aspect.
Figure 4B:
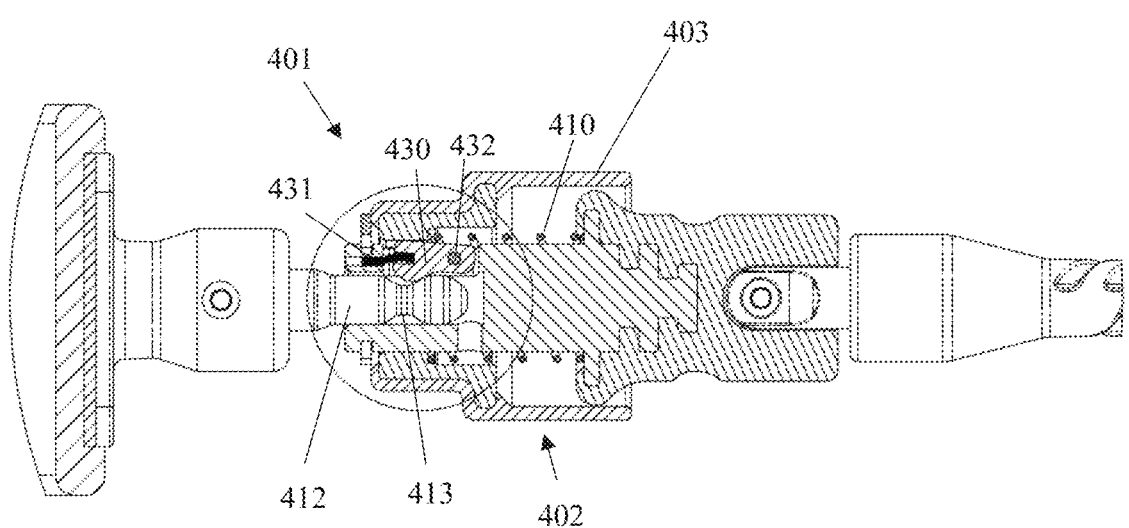
FIG. 4B illustrates the cross-sectional view of the swivel lock quick release device in a locked position, according to an aspect.

In another example, FIG. 4A illustrates the perspective view of the swivel lock quick release device in a locked position, according to an aspect. FIG. 4B illustrates the cross-sectional view of the swivel lock quick release device in a locked position, according to an aspect. FIG. 4B illustrates the cross-section view of the cam lock mechanism within the swivel lock quick release device. A cam 430 on a shaft 432 may perform the same locking and unlocking procedure as the balls described hereinabove. The cam 430 may engage with the protrusion 412 to lock the protrusion and the pull release pull release 402 together.

The cam 430 on a shaft 432 may perform the same function of holding a stem ("protrusion") 412 in a housing due to the indentation 413 in the stem 412 being met with a moveable jamming feature of the cam 430, when the slide handle 402a with grip 403 is released against the pull release stopper 424. The spring wire 431 may attach to the cam and slide handle 402a to allow the cam to pivot and disengage from the protrusion 412.

Figure 4C:
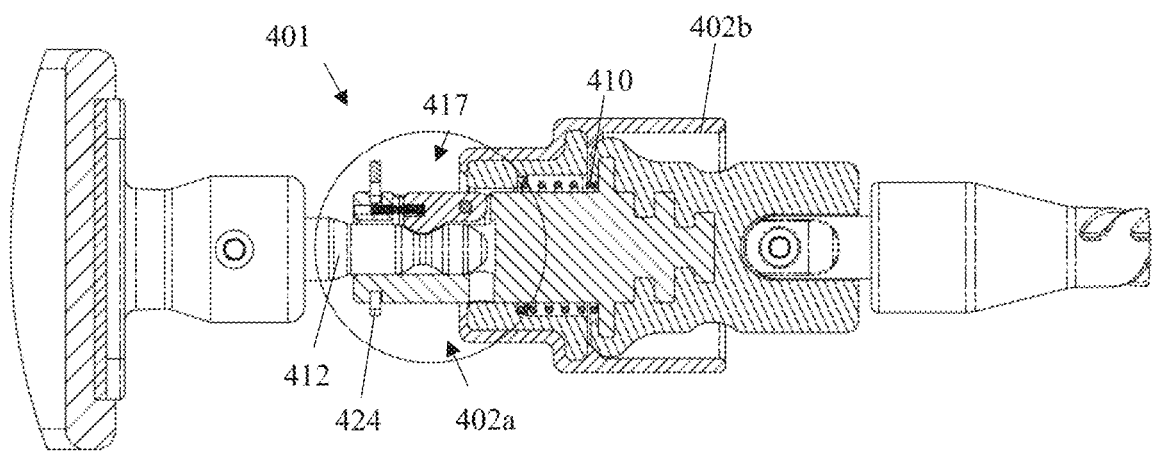
FIG. 4C illustrates the cross-sectional view of the swivel lock quick release device in a partially unlocked position, according to an aspect.

FIG. 4C illustrates the cross-sectional view of the swivel lock quick release device in a partially unlocked position, according to an aspect. As shown, the pull release 402 may have two components: a slide handle 402a and a locking component 402b. As described herein, the slide handle 402a may slide into the second position to allow the cam 430 on a shaft 432 to disengage from the protrusion 412. The locking component 402b may have a recess (325) extending inside the locking component 402b and the recess (325) may be configured to receive the protrusion 412. The locking component 402b may also have a housing 418b for the cam 430, the housing 418b may be adapted to allow the cam 430 to engage with the indentation 413 in the protrusion 412, which would create a locked position. Additionally, the cam 430 would be adapted to move between the indentation 413 on the protrusion 412 and the groove 417 to allow the pull release 402 to disengage from the protrusion 412. The pull release 402 would also have a spring 410 disposed between the slide handle 402a and the locking component 402b, which would allow the pull release 402 to have a first and second position. The pull release's first position is shown by FIG. 4B, and the second position is shown by FIG. 4C. The first position being when the spring is in a normal, uncompressed state and the cam 430 engage with the protrusion 412, while the second position being when the spring 410 is compressed, and the cam 430 engages with the groove 413.

Figure 4D:
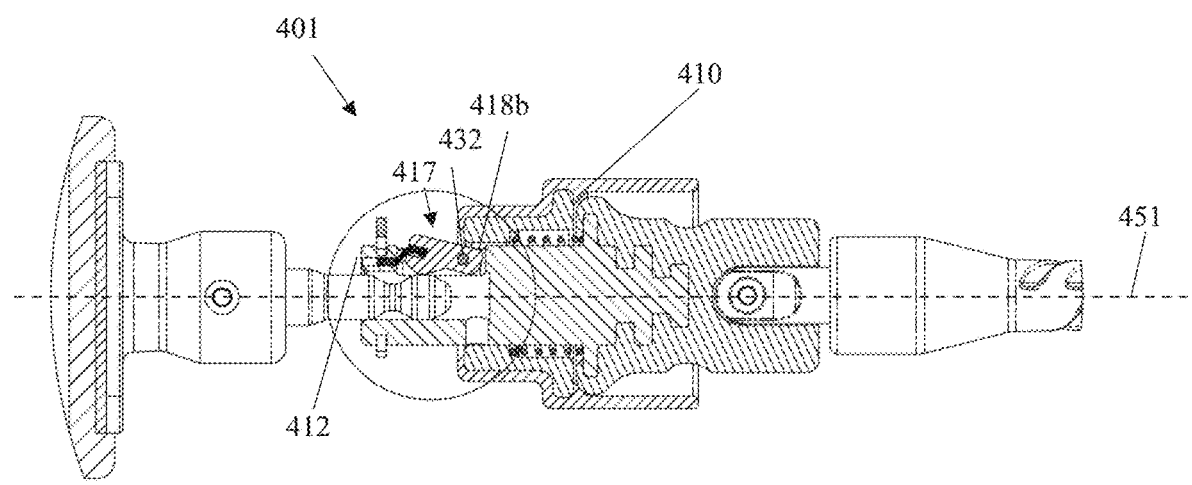
FIG. 4D illustrates the cross-sectional view of the swivel lock quick release device in an unlocked position, according to an aspect.

FIG. 4D illustrates the cross-sectional view of the swivel lock quick release device 401 in an unlocked position, according to an aspect. For example, the shaft 432 may be affixed in the cam housing 418b by press-fitting or with an adhesive. The cam 430 may be held horizontal with respect to the centerline axis 451 of the locking component 402b by a piece of spring wire 431. Moreover, the cam 430 may deflect outward without falling radially inward and jamming the protrusion 412 from entering the recess 425 fully. Additionally, the cam 430 may be returned to the horizontal position before and after a protrusion 412 is inserted or removed from the housing because of the support of the spring wire 431. For example, when the cam 430 is engaged with the protrusion 412, tension is developed by the tether and 404 the cam 430, which may rotate outward. The sleeve ("slide handle") 402a enclosing the cam 430 may help resist this translation and provide a resistance force, allowing the cam 430 to stay engaged with the protrusion 412. As described herein, the insertion or removal of the protrusion 412 from the pull release 402 will result in the coupling or uncoupling of the tether to or from the strap, respectively.

Figure 4E:
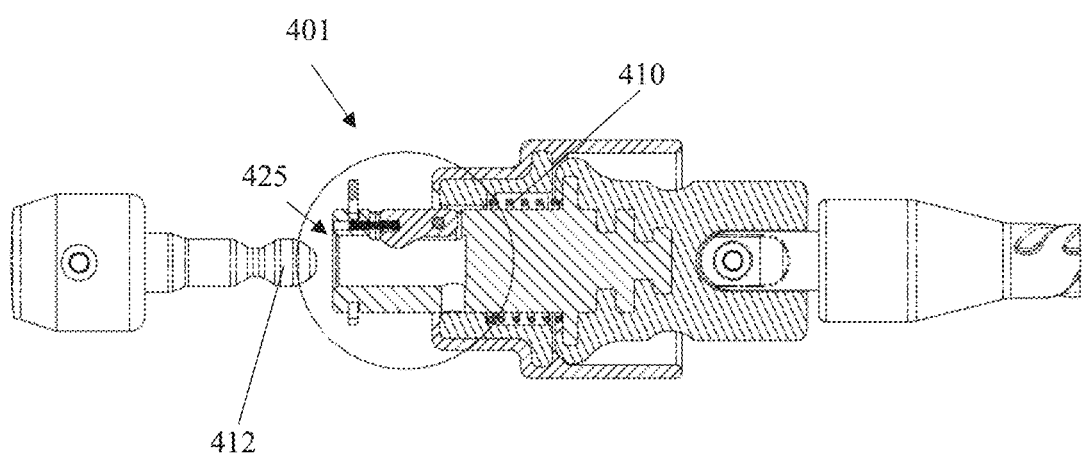
FIG. 4E illustrates the cross-sectional view of the swivel lock quick release device in a separated, unlocked position, according to an aspect.

FIG. 4E illustrates the cross-sectional view of the swivel lock quick release device 401 in a separated, unlocked position, in an unlocked position according to an aspect. In an example, the swivel lock quick release device 401 may be used for sports equipment such as surfing, stand-up paddling, fishing, sailing, hunting, or kite surfing equipment. In another example, the swivel lock quick release device 401 may be used for animal accessories, such as an animal collar or a leash and halter apparatus. As described herein, the user may need to disengage themselves from the tether in situations such as the tide pulling the board down, harsh waters, and other dangerous situations that may occur in bodies of water. Additionally, other sports may need a swivel lock quick release device for similar reasons, such as detaching themselves from their sports equipment during dangerous situations or other situations that the user would desire disengaging the item from the tether.

Figure 5A:
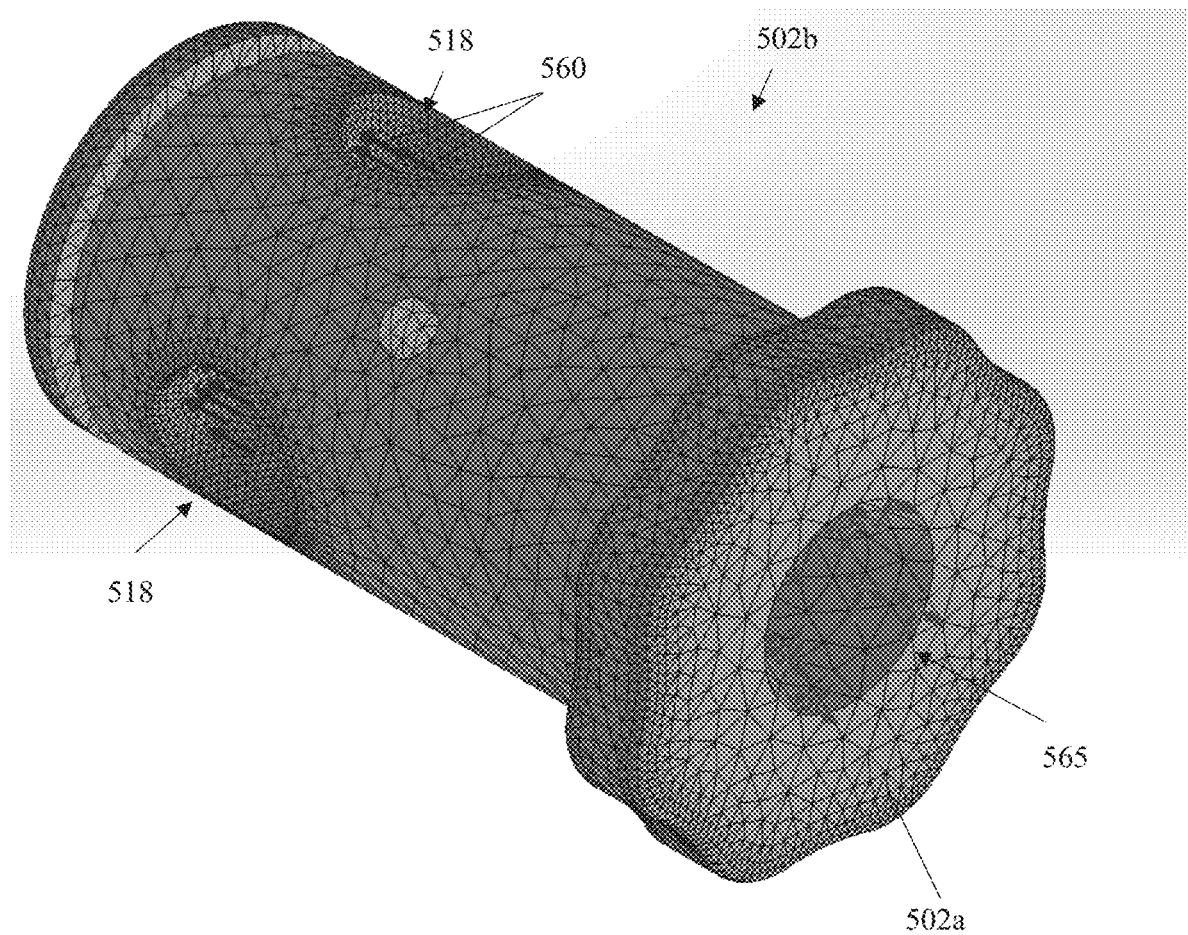
FIG. 5A illustrates the perspective view of the locking component with loads applied in the axial direction, according to an aspect.
Figure 5B:
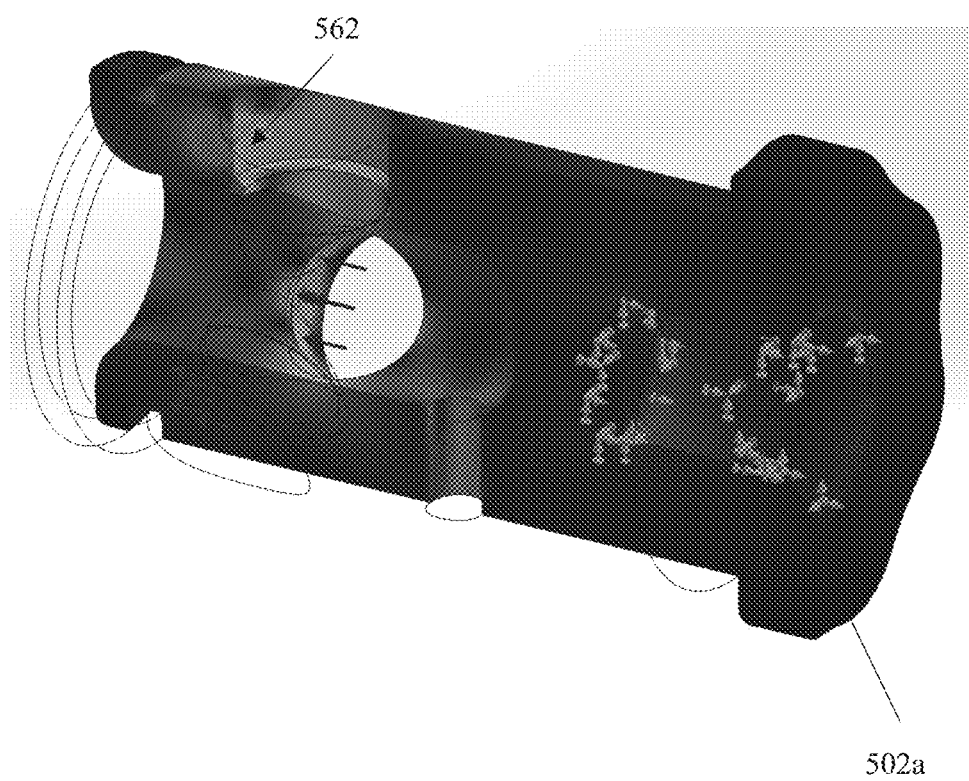
FIG. 5B illustrates the cross-sectional view of the locking component with loads applied in the axial direction, according to an aspect.

FIG. 5A illustrates the perspective view of the locking component 502b with loads applied in the axial direction, according to an aspect. While FIG. 5B illustrates the cross-sectional view of the locking component 502b with loads applied in the axial direction, according to an aspect. Shown in FIGS. 5A and 5B is a von Mises stress test to determine yield strength test, which was performed through Solidworks by applying a 600 lbf load in the axial direction, shown by arrows 560. The test applied loads to the ball housing 518 of the locking component 502b and 600/3 lbf was applied to each ball housing 518. Additionally, the loads were applied at 0.25" diameter dimples and 0.003" indentations and was fixtured at the bonded cable connection point 565, which the joint 350a connects to, proximate to the flange 502a. It was also assumed the balls used are harder than aluminum. This locking component is also shown and tested at the three-ball configuration. The test resulted in a yield strength of 39,885 psi, which is below the yield strength for 6061-T6 aluminum. This means if 6061-T6 aluminum is used the system will not fail with an 600/3 lbf applied force. As shown, the gradient of grey on the locking component 502b demonstrates how much stress each portion of the part experiences when a load is applied. For example, the light grey 562 shows that more stress occurs there when a force is applied.

Figure 6A:
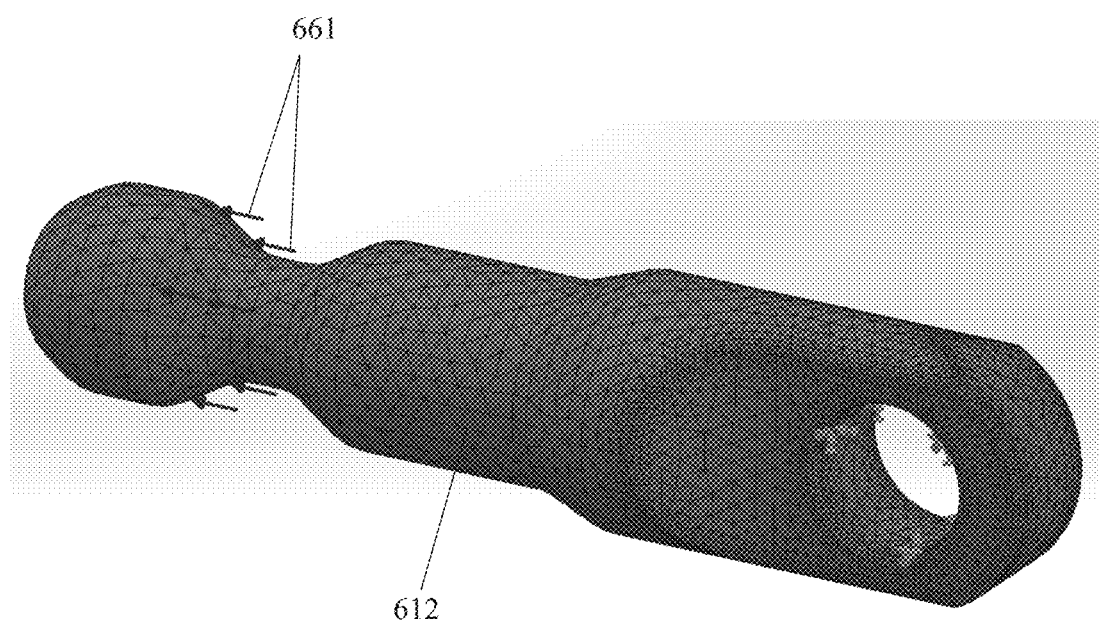
FIG. 6A illustrates the perspective view of the protrusion with loads applied in the axial direction, according to an aspect.
Figure 6B:
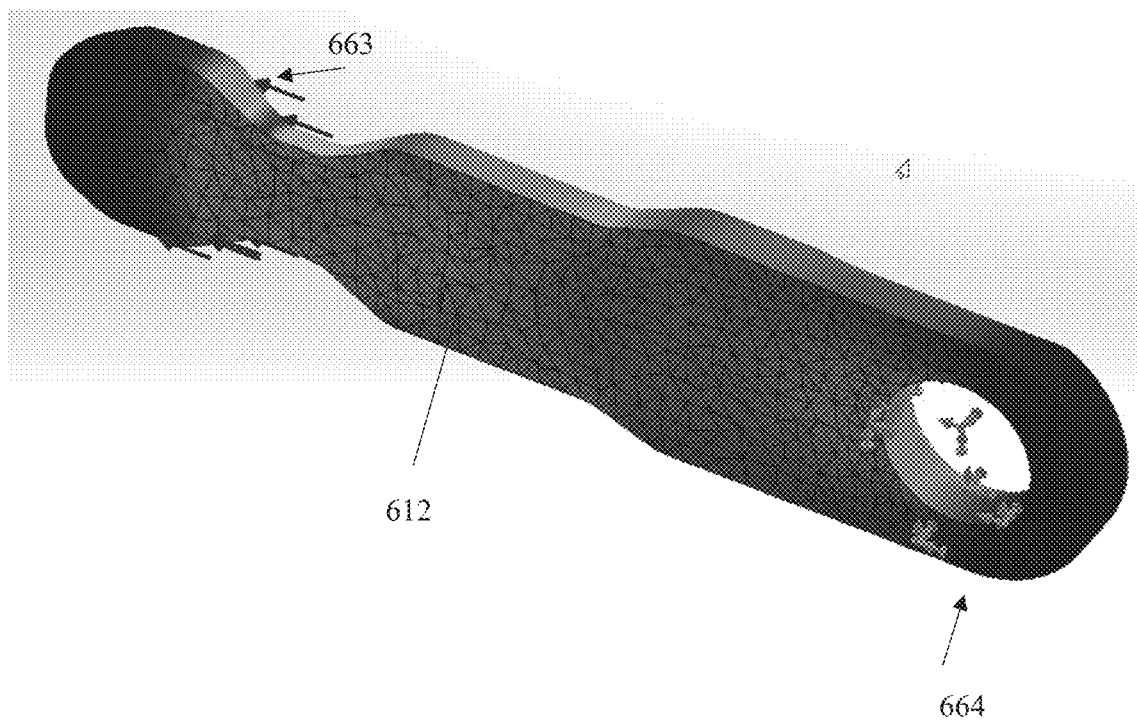
FIG. 6B illustrates the cross-sectional view of the protrusion with loads applied in the axial direction, according to an aspect.

FIG. 6A illustrates the perspective view of the protrusion 612 with loads applied in the axial direction, according to an aspect. While FIG. 6B illustrates the cross-sectional view of the protrusion 612 with loads applied in the axial direction, according to an aspect. Shown in FIGS. 6A and 6B is a von Mises stress test to determine yield strength test, which was performed through Solidworks by applying a 600 lbf load in the axial direction, shown by arrows 661. The test applied loads evenly to the conical face of protrusion 612 and the direction of the applied loads was purely axial. Additionally, the loads were applied at 0.25" dimples of 0.002" depth and was fixtured at the eye hole or eyelet 664 of the protrusion 612, which where the protrusion 612 may attach to a strap. This protrusion is also shown and tested at the three-ball configuration. The test resulted in a yield strength of 20,000 psi, which is below the yield strength for 2205 stainless. This means if 2205 is used the system will not fail with a 600 lbf applied force. Furthermore, if a load of 300 lbf is used, the yield strength is below 316 or 304 stainless steel, meaning these materials may also be used for the swivel lock quick release device. As shown, the gradient of grey on the protrusion 612 demonstrates how much stress each portion of the part experiences when a load is applied. For example, the light grey 663 shows that more stress occurs there when a force is applied.

FIG. 7A illustrates a perspective view of an exemplary embodiment of a grip cover (also referred to herein as "cover") 766 for a swivel lock 701 or another suitable quick release lock. As shown, the center portion of the grip cover 766, referred to as the grip body 768, may have a regular cylindrical shape, and the grip cover 766 can also include two openings 770 and 771 at opposite ends of the grip body 768, wherein opening 770 is referred to herein as a recess side opening 770 and opening 771 is referred to herein as a ridge side opening 771. A recess grip end 769 surrounding the recess side opening 770 may curve inwards, such that recess grip end 769 has a smaller diameter than the grip body 768, as shown in more detail when referring to FIG. 9. Said recess grip end 769 may be configured to cover the recess end 773 of the pull release 702 to prevent infiltration of water or other materials into said pull release 702. A ridge grip end 781 surrounding the ridge side opening 771 may also curve inwards, such that the ridge grip end 781 also has a smaller diameter than the grip body. Said ridge grip end 781 may be configured to cover the ridge end 772 of the pull release 702 to further prevent the infiltration of water or other materials into said pull release 702. The grip ridge 767 may be secured between the grip body 768 and the ridge side opening 771 and may curve such the diameter of the grip ridge 767 is initially greater than, then less than that of grip body 768 upon reaching the ridge side opening 771, as disclosed in greater detail in FIG. 9 and FIG. 10 hereinbelow. An internal ridge, such as internal or inner ridge 1174 of FIG. 11, may be nested within the grip body 768 and configured to nest within a ridge slot embedded within a pull release 702, such as ridge slot 1175 on pull release 1102 of FIG. 11. in order to improve engagement with and conform to the shape of a swivel lock quick release device 701.

FIG. 7B illustrates the perspective view of the swivel lock quick release device 701, according to an aspect. As an example, the swivel lock quick release device 701 may be adapted to selectively attach a user to a floatation device (not shown). The floatation device may be watersports equipment, such as, but not limited to, a surfboard, a stand-up paddle board, a kite surfing harness, a fishing rod and reel, a wake board, and the like. It should be noted that the swivel lock quick release device can also be configured for use in land sports or other applications which utilize a tether.

The swivel lock quick release device 701 may have a first connector, such as pull release 702, and second connector, such as protrusion 712, wherein the protrusion 712 can be inserted into a recess 725 in the pull release 702 via a guiding flange or recess end 722 surrounding the entry into the recess 725. The described coupling of the first connector of the swivel lock 701 with the second connector of the swivel lock 701 may be done selectively to allow the user to not only separate themselves from a piece of equipment quickly and easily, but also to easily reattach themselves to said equipment at will. The pull release 702 and protrusion 712 can be adapted to be selectively engaged into a locked position, as described hereinabove. A slide handle 702a, which is a portion of the pull release 702, can be adapted to be selectively moved in a coaxial direction by the user to disengage the pull release 702 and the protrusion 712, as described hereinabove. The pull release 702 can also be adapted to rotate around the protrusion 712 allowing the swivel lock quick release device 701 to swivel as needed. Additionally, the swivel lock quick release device 701 may be attached to a tether 704 and a strap 705, as shown. The tether 704 may be adapted to attach to athletic equipment, while the strap 705 may be adapted to attach to the user (not shown). This connection between the pull release 702 and a protrusion 712 may allow the user to first lock themselves to the athletic equipment, and then quickly and reliably disengage themselves from said equipment, such as, for example, in dangerous situations. Having a reliable locking tether that swivels and functions with a quick and reliable means to disengage while participating in aquatic and or land athletics, sports, or other activities, is critical due to the need to not only be safely fastened to the object but the need to quickly and safely release from the object because of possible scenarios, dangerous or otherwise, a user may encounter, enjoy, or benefit from.

It should be understood that the swivel lock quick release device 701 can have a multitude of configurations. For example, in some embodiments, the device 701 may have a pull release that is longer than the pull release 702 shown as an example in FIG. 7B, which may be advantageous in certain watersport scenarios, such as for example surfing big waves, in which a longer pull releases would be easier to use.

In the exemplary embodiment shown by FIG. 7A, the grip cover 766 is configured to cover the pull release 702 of a swivel lock quick release device ("swivel lock") 701 shown in FIG. 7B. As shown, the cylindrical grip body 768, grip ridge 767, and recess grip end 769 of the grip cover 766 correspondingly cover the slide handle 702a, grip 703, and recess end 773 of the pull release 702, such that the grip cover 766 conforms to the shape of the pull release 702 and the grip cover 766 and pull release 702 are flush. It should be understood that the shape of the grip cover 766 can be manufactured to cover a multitude of configurations of a pull release 702, for example a longer pull release. As another example a pull release with two, three, four, or more grips 703. Shown in FIG. 7B as an example is a pull release with one grip 703.

Providing a grip cover 766 for a swivel lock 701 can help prevent users from becoming injured by ensuring they are able to operate the swivel lock 701 (i.e., detach from the tether) easily and quickly during dangerous situations. A grip cover 766 can help users more easily operate the swivel lock 701 by eliminating the potential slipperiness of the pull release 702. Eliminating slipperiness may be achieved by manufacturing the grip cover 766 from materials having a relatively high coefficient of static friction when wet (such as compared to metal or plastic) and designing the grip cover 766 to have a textured surface, such as ridges or bumps. As an example, the material used may be sustainable algae foam. Additionally, a grip cover 766 can help users more quickly find and operate the swivel lock 701 by making the swivel lock 701 float. Floatation can be achieved by designing the grip cover 766 to be lightweight, for example less than 1 lb, and manufacturing the grip cover 766 from a buoyant material, such as algae foam. Another benefit of the grip cover 766 is protecting users from damaging their hands while operating the swivel lock 701 or being injured from accidentally hitting or being hit by the swivel lock 701 during a dangerous scenario, for example. Providing a grip cover 766 also protects nearby surfaces from becoming damaged if the swivel lock 701 collides with them during a dangerous scenario.

As an example, the grip cover 766 can be sustainably produced from a material such as algae foam, or latex foam, for example. Other such materials that can be used to construct the grip cover 766 include but are not limited to thermoformed EVA copolymer foam, natural rubber, vinyl, neoprene, and polyurethane and PVC foams.

Additionally, a grip cover 766 may increase the reliability of the swivel lock 701 by protecting the swivel lock 701 from corrosion due to water and the environment. In some embodiments such as the embodiment shown in FIG. 7A, the grip cover 766 may prevent corrosion of the pull release 702. In some embodiments, the grip cover may additionally prevent corrosion of the internal locking mechanisms by sealing the recess end 722 and the ridge end 772 of the pull release 702, for example. Protection against corrosion can be achieved by manufacturing the grip cover from a waterproof material and designing the grip cover to conform around and seal the ridge end 772 and the recess end 773. The sealing of the ridge end 772 and the recess end 773 of a swivel lock 701 or comparable quick release lock may prevent the infiltration of water or other undesirable materials into said swivel lock 701/quick release lock.

Figure 8:
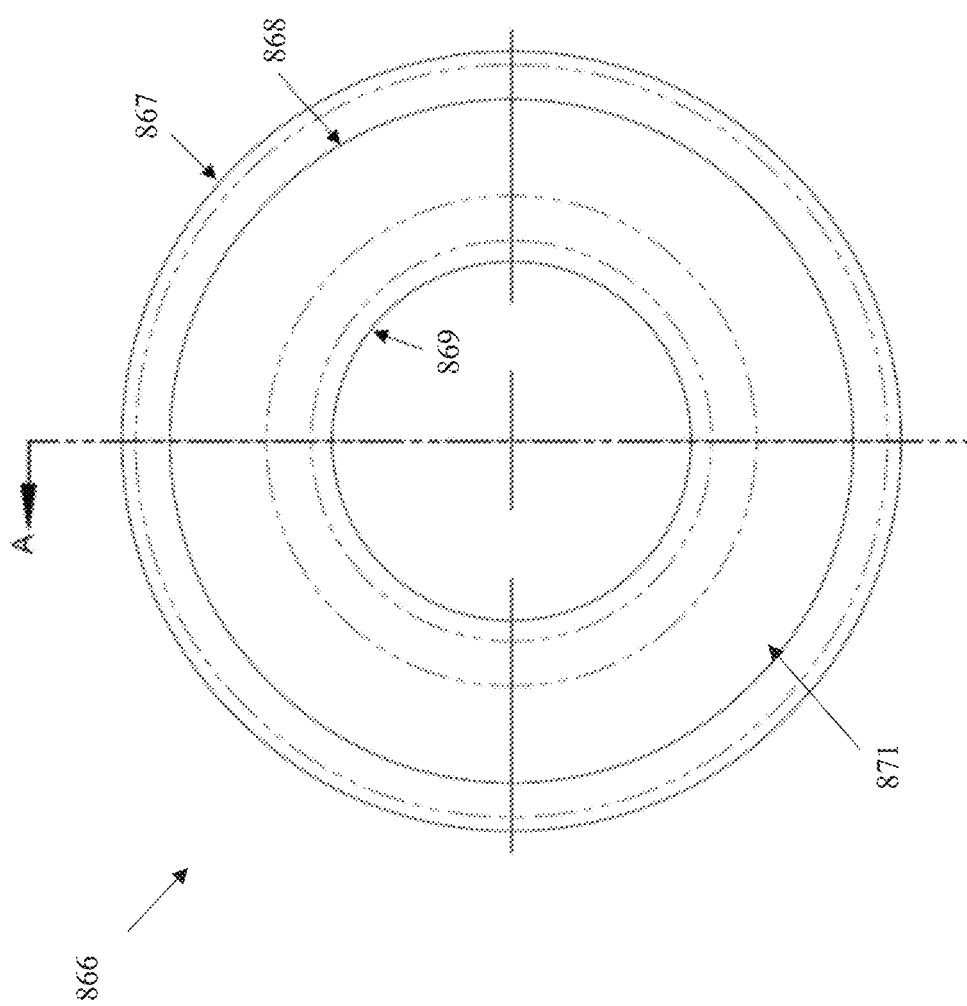
FIG. 8 illustrates a side view of the grip cover, according to an aspect.

FIG. 8 illustrates a side view of the ridge side opening 871 of the grip cover 866, according to an aspect. As shown, the grip cover may have a cylindrical design. As shown, the widest diameter portion of the grip ridge 867 may have the largest diameter on the grip cover 866, the outer edge of the grip body 868 may have a slightly smaller diameter than said widest diameter portion of the grip ridge 867, and the internal edge of the recess grip end 869 may have the smallest diameter on the grip cover 866. Line A-A of FIG. 8 may bisect the grip cover 866 to illustrate a cross sectional view of said grip cover 866.

Figure 9:
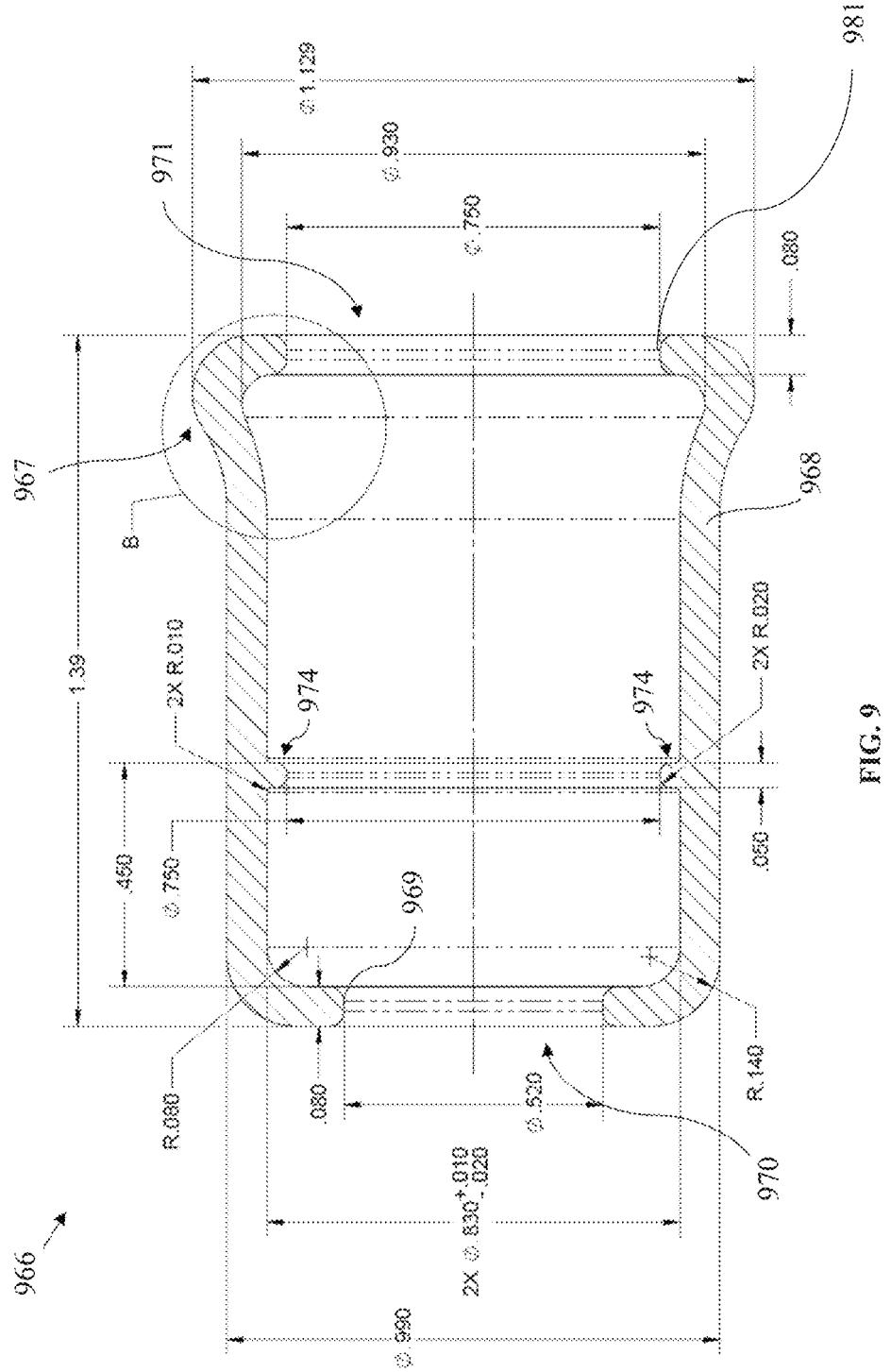
FIG. 9 illustrates a cross sectional view and exemplary dimensions of an exemplary grip cover 100, according to an aspect.

FIG. 9 illustrates a cross sectional view taken along line A-A of FIG. 8, and exemplary dimensions, of an exemplary grip cover 966, according to an aspect. As disclosed hereinbefore, the grip cover 966 may preferably be manufactured to conform to the shape of a pull release, such as pull release 702 of FIG. 7B, and be flush with said pull release 702. Thus, in some embodiments, a grip cover 966 may be provided with an internal ridge 974 in order to conform to the shape of the pull release 702. Providing a pull release 702 and grip cover 966 with corresponding grip ridge 967 and internal ridge 974 may allow the grip cover 766 to engage with the swivel lock 701 to better stay in place when attached to the swivel lock. The grip cover 966 can have an internally extending edge, flange, or lip 981 to further secure and seal the locking component. It should also be understood that the grip cover 966 can be provided in a variety of shapes and sizes in order to cover different pull releases. For example, in some embodiments, a longer grip cover 966 may be provided to protect a longer pull release, or a shorter grip cover 966 may be provided to protect a shorter pull release. It should be understood that the grip cover 966 can be provided in any suitable conformation and shape to protect any suitable mechanisms used for swivel lock, and the like.

As shown, the thickness of the grip body 968 and may be 0.08 inches (in). The diameter of the recess side opening 970 at the recess grip end 969 may be 0.52 in. The internal diameter of the grip body 968 may be 0.83 in and the external diameter may be 0.99 in. Additionally, there may be an internal ridge 974 nested within the grip cover 966 with an internal diameter of 0.75 in and a thickness of 0.05 in, wherein the internal ridge 974 may divide the internal cavity of the grip body 968. The largest internal diameter of the grip ridge 967 may be 0.93 in and the largest external diameter may be 1.129 in. The diameter of the ridge side opening 971 may be 0.75 in.

Figure 10:
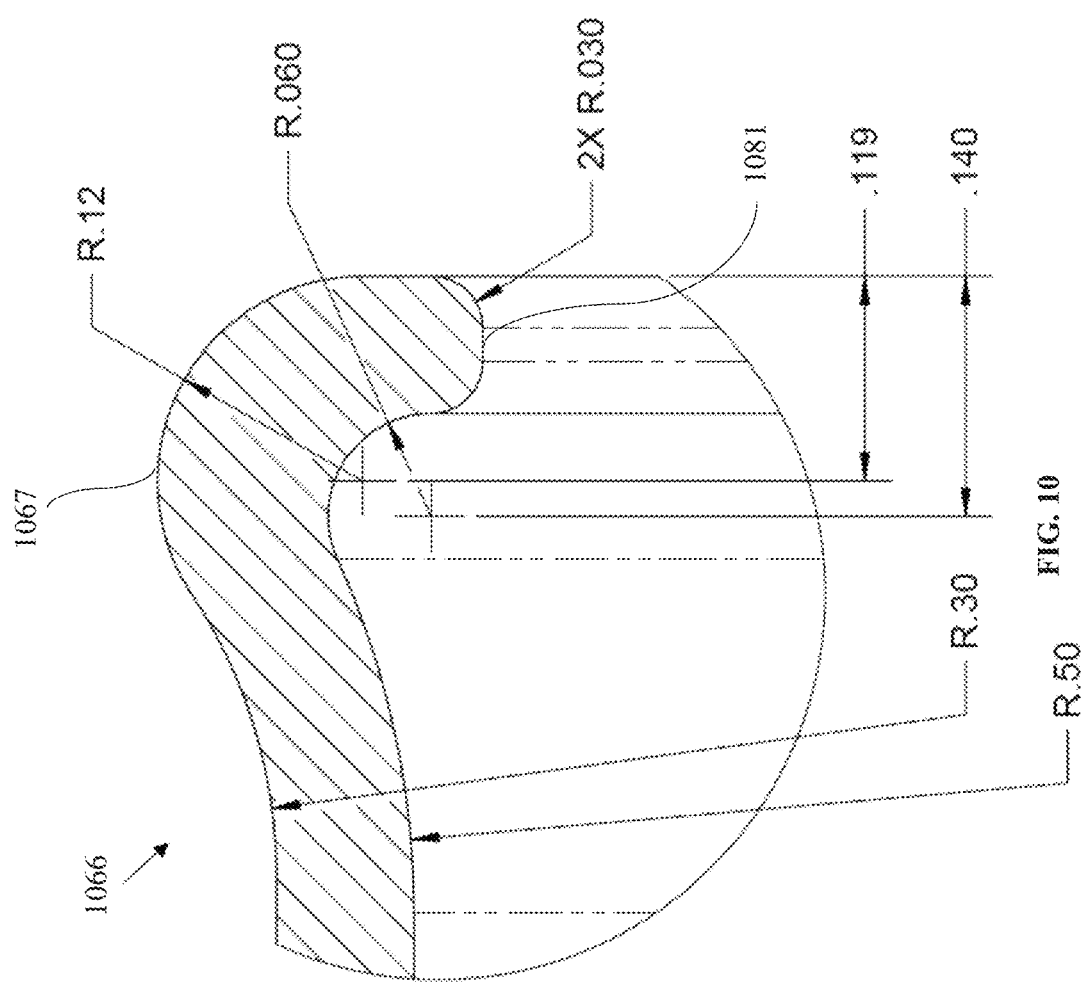
FIG. 10 illustrates a magnified view of a portion of the cross section, and exemplary dimensions, of the grip ridge of the grip cover, according to an aspect.

FIG. 10 illustrates a magnified view of area B of FIG. 9, and exemplary dimensions, of the grip ridge 1067 of the grip cover 1066, according to an aspect. The dimensions illustrated in FIGS. 9 and 10 are examples are non-limiting; the dimensions are for illustrative purposes, including various relative dimensions and rations of the grip cover, and may vary. As disclosed hereinbefore, the grip cover 1066 may preferably be manufactured to conform to the shape of a pull release, such as pull release 702 of FIG. 7B, and may be flush with the said pull release. Thus, the shape for the curve of the grip ridge 1067 may be designed to correspond to the shape of the ridge of the pull release, such as grip 703 of pull release 702 in FIG. 7B, including a curvature that extends to an edge, flange, or lip 1081 to further secure and seal the locking component. As an example, the shape for the curve of the grip ridge 1067 is described by the radius dimensions, from left to right, 0.5R, 0.3R, 0.12R, 0.06R, and 2×0.03R, where "R" represents the radius.

Figure 11:
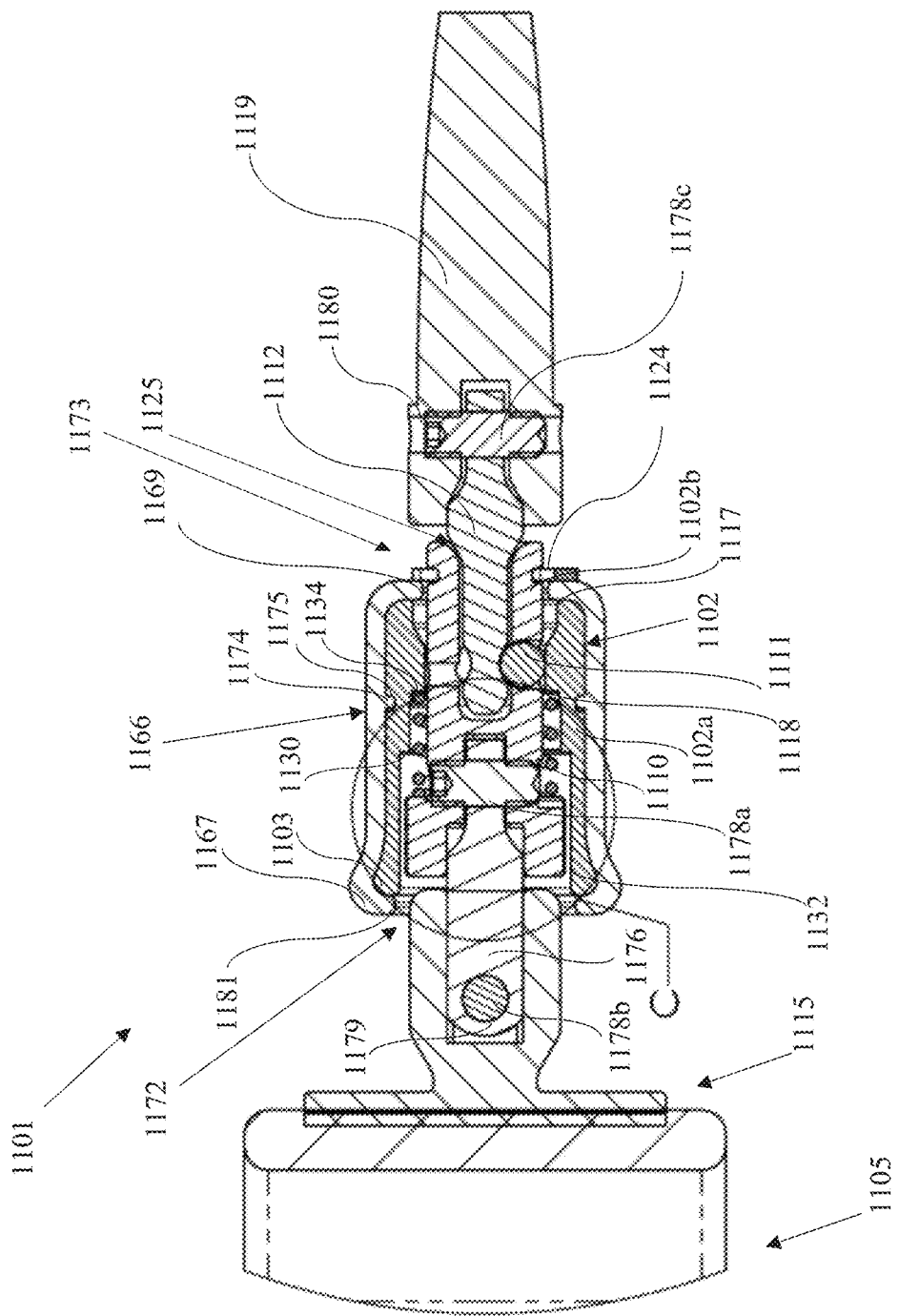
FIG. 11 illustrates a cross sectional view of a grip cover engaging with an alternatively configured swivel lock quick release device, according to an aspect.

FIG. 11 illustrates a cross sectional view of a grip cover 1166 engaging with an alternatively configured swivel lock quick release device 1101, according to an aspect. As can be seen from the configuration of swivel lock 1101, in contrast to previously shown swivel lock configurations, the protrusion, stem, or pole 1112 may be secured to the tether and the pull release 1102 may be secured to the strap 1105. Each of the protrusion 1112 and the pull release 1102 of the swivel lock 1101 may be secured to either the tether or the strap 1105, so long as it does not negatively impact device functionality or the user's ability to reliably engage and disengage the pull release 1102 from the protrusion 1112 in the recess, opening, coaxial opening, or cavity 1125 through a simple coaxial motion. As illustrated, the recess 1125 is coaxial with the locking component 1102b such that the central axis of the recess 1125 and the locking component 1102b are aligned or coincide along the engagement axis 1382. While the tether is not shown, the guard or guard attachment 1119 may attach to said tether in order to connect the swivel lock 1101 to sports equipment (not shown) or another suitable object.

The inclusion of a ridge slot 1175 embedded within the slide handle, cylinder, or sleeve 1102a of the pull release 1102 may facilitate a more secure engagement of the grip cover 1166 over the swivel lock 1101. As discussed herein, the locking component 1102b can have a ball housing, opening, radial opening, or hole 1118 within which a ball (e.g., ball bearing) 1111 radially moves into and out of the indentation of the protrusion depending on the position of the groove 1117 of the slide handle 1102a. The sleeve 1102a can have a first ridge 1130 on an inner surface or inner cylindrical surface 1132. The first ridge 1130 presses against the flange in the second position to inhibit further axial movement of the sleeve 1102a from the first position to the second position. The sleeve 1102a can have a second ridge 1134 on the inner surface 1132, wherein the spring 1110 presses against the second ridge 1134 of the sleeve 1102a to bias the sleeve 1102a into the first position relative to the locking body 1102b.

The previously discussed inner ridge of the grip cover 1166 may be nested within the ridge slot 1175 while installed. The engagement of the inner ridge 1174 with the ridge slot 1175 and the engagement of the grip 1103 with the grip ridge 1167 may help to maintain a secure connection between the grip cover 1166 and the swivel lock 1101 that does not come loose during usage, even during dangerous situations. As described hereinabove, the engagement of the recess grip end 1169 with the recess end 1173 and the engagement of the ridge grip end 1181 with the ridge end 1172 may facilitate an airtight seal around the pull release 1102 of the swivel lock 1101, helping to protect the swivel lock 1101 from environmental factors, such as corrosion, during use. The grip ridge 1167 and/or grip cam provide flaring features for hand grip purposes without hydraulic loads pulling the sleeve 1102a back when dragged underwater, for example.

Also as shown in FIG. 11, the swivel lock 1101 may have a pull release stopper or washer 1124 adapted to stop the slide handle 1102a from traveling past the locking component, portion, tube, or body 1102b. The pull release stopper 1124 prevents the pull release 1102 from disassembling and assures the balls 1111 are contained within the ball housing 1118 to grip the protrusion 1112.

Figure 15A:
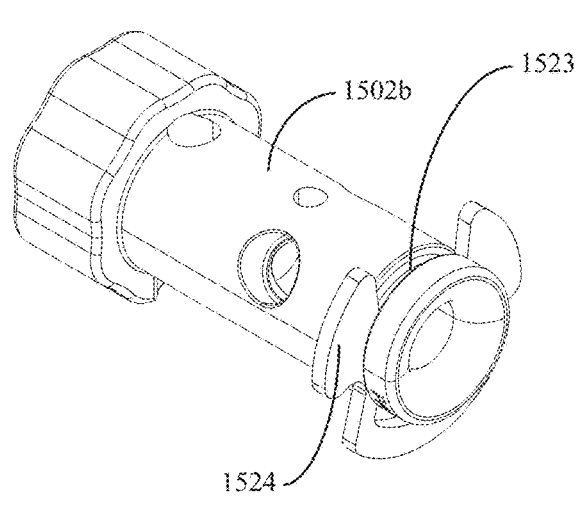
FIG. 15A illustrates a perspective view of a locking component and removable pull release stopper of a swivel lock quick release device, according to an aspect.
Figure 15B:
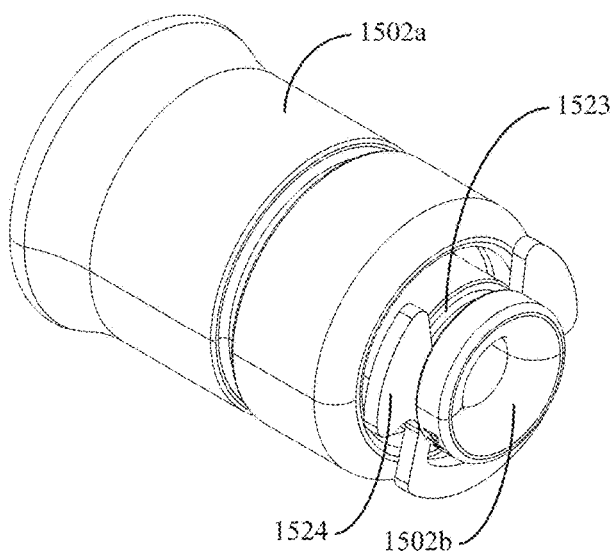
FIG. 15B illustrates a perspective view of a locking component, slide handle, and removable pull release stopper of a swivel lock quick release device, according to an aspect.

FIG. 15A illustrates the interaction of the locking component 1502b and the pull release stopper 1524. FIG. 15B further illustrates the slide handle 1502a for reference. The locking component 1502b may have a channel, groove, slot 1523 configured to receive the pull release stopper 1524. As described below, the pull release stopper 1524 may be configured to be removable from the channel 1523. The ability to remove the pull release stopper 1524 is advantageous because it allows for the slide handle 1502a to be disassembled from the locking component 1502b. Such disassembly allows for maintenance or replacement of the internal components of the swivel lock. For example, as described herein in connection with FIG. 11, the swivel lock 1101 may have a first securing bit 1178a disposed within the pull release 1102. By removing the pull release stopper 1124, a user may remove the slide handle 1102a and access the securing bit 1178a. In another example, the user may remove the pull release stopper 1124 and the slide handle 1102a to replace the spring 1110 in the event that the spring 1110 wears out, is damaged, or is to be replaced with another spring or springs. The spring may be replaced with a different spring that provides a different resistance or bias force for the pull release, allowing for adjustment of spring forces according to a user's preference or desired application.

Figure 15C:
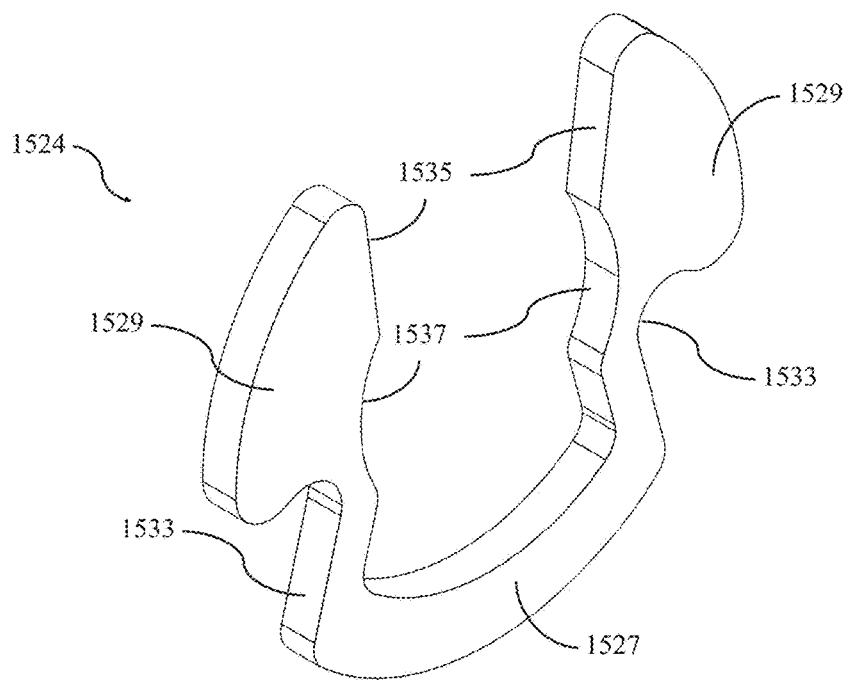
FIG. 15C illustrates a perspective view of a pull release stopper of a swivel lock quick release device, according to an aspect.

As illustrated in FIG. 15C, the pull release stopper 1524 may be generally U-shaped. It may have a base 1527 and arms 1529. The pull release stopper 1524 may be configured with indentations, gripping surfaces 1533. The gripping surfaces 1533 may provide a location for a user to exert force to either push the pull release stopper 1524 over the diameter of the channel 1523 or pull the pull release stopper free from the channel 1523. The arms 1529 may also be configured with guiding surfaces 1535 leading to a central locking shape 1537. The guiding surfaces 1535 may be generally V-shaped and may be configured to assist a user in positioning the pull release stopper 1524 over the channel 1523 before pressing the pull release stopper into the channel 1523. The central locking shape 1537 is configured to be the same size and shape as the inner surface of the channel 1523. For instance, as illustrated in FIGS. 15A-15B, the inner surface of the channel 1523 may be circular, and the central locking shape 1537 of the pull release stopper 1524 may be a circle of the same size. Alternatively, the inner surface of the channel 1523 and the central locking shape 1537 may be corresponding squares, pentagons, hexagons, or any other shape.

As discussed herein for the swivel lock device 301 described in FIG. 3A-3D, the herein disclosed swivel lock 1101 of FIG. 11 may utilize a securing bit, fastener, screw, or bolt 1178b disposed between the strap and a connector. However, the specific connector that it is attached to may differ depending on the orientation of said swivel lock 1101. In contrast to the swivel lock 301 of FIG. 3A-3D, wherein the strap junction 315 is connected to the protrusion 312 by a joint, the strap junction 1115 of swivel lock 1101 may instead be attached to a junction rod 1176, wherein said junction rod 1176 is secured to the pull release 1102. It should be understood that variations on how the components of the swivel lock quick release assembly interconnect may be implemented as needed in order to accommodate the specific orientations of the first connector (pull release) 1102 and second connector (protrusion) 1112. It may be beneficial to provide said connectors in the specific orientation depicted in FIG. 11 in order to make manipulation of the pull release faster and more reliable, as will be discussed in greater detail hereinbelow in FIG. 13A-13C. The grip cover may be configured to cover the disclosed swivel lock 1101 or other comparable quick release locks, wherein the disclosed swivel lock 1101 is a type of quick release lock.

A first securing bit, fastener, screw, or bolt 1178a may be used to secure the pull release 1102 to the junction rod 1176. A second securing bit, fastener, screw, or bolt 1178b may be used to secure the junction rod 1176 to the strap 1105 (e.g., to the strap junction 1115). A third securing bit, fastener, screw, or bolt 1178c may be used to secure the protrusion 1112 to the tether (e.g., to the guard 1119).

The first securing bit or fastener 1178a may be both inserted through the junction rod 1176, such as a first eyelet or opening 1277 of the junction rod 1176, and nested (e.g., screwed in) within a fastening port or fastener opening 1280 within strap junction 1115, such that the junction rod 1176 is secured to said locking component 1102b, thus securing said pull release to the strap 1105. The second securing bit or fastener 1178b, 1478b may be both inserted through the junction rod 1176, such as a second eyelet or opening 1179 of the junction rod 1176, and nested (e.g., screwed in) within a fastening port or fastener opening 1480 within strap junction 1115, such that the junction rod 1176 is secured to said strap junction 1115, thus securing said pull release to the strap 1105. As illustrated in FIG. 11, a central axis of the first opening 1277 and a central axis the second opening 1179 may be perpendicular to each other. In some embodiments, the central axis of the first opening 1277 and the central axis the second opening 1179 may be parallel to each other.

Figure 12:
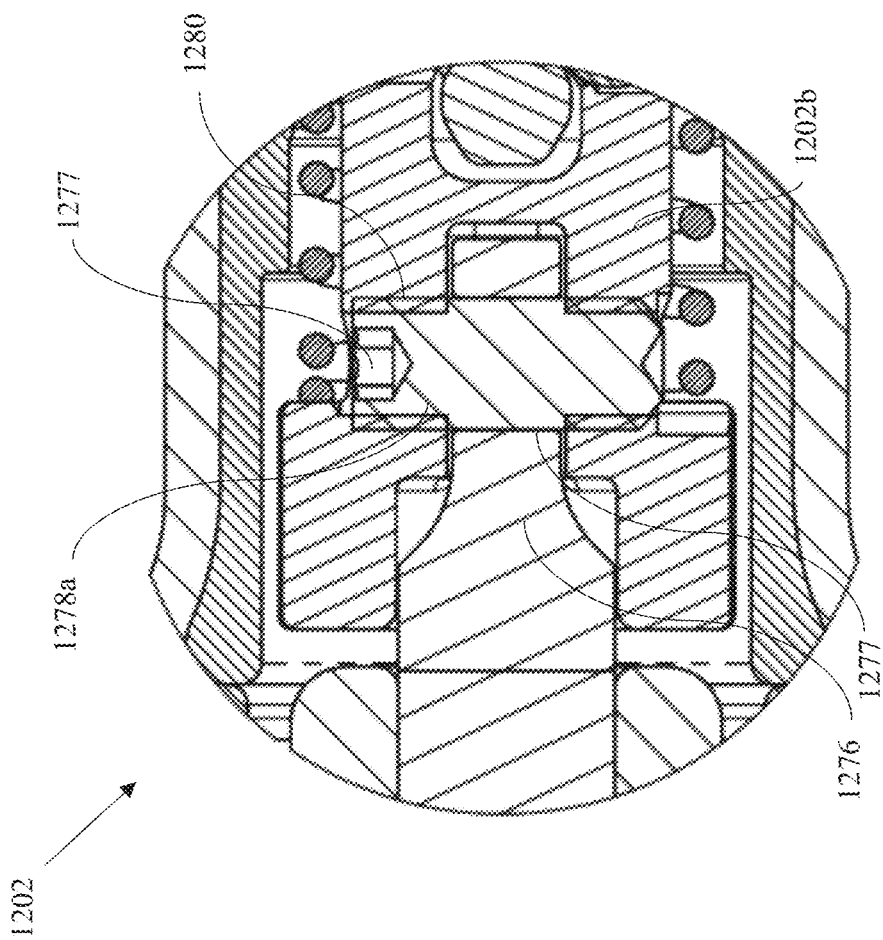
FIG. 12 illustrates a cross sectional view of the first securing bit within the pull release of a swivel lock, according to an aspect.

FIG. 12 illustrates a cross sectional view of the first securing bit 1278a within the pull release 1202 of a swivel lock 1101, according to an aspect. Both the connection between the first connector or pull release 1102 to the attached strap junction 1115 and the connection of the second connector or protrusion 1112 to the guard 1119 may be facilitated by the usage of the disclosed securing bits, fasteners, screws, or bolts. The first securing bit 1278a disposed between the locking portion 1202b of the pull release 1102 and the strap junction may be inserted through a junction rod 1276, said first securing bit 1278a having hexagonal slots 1277 nested within opposite ends of said first securing bit 1278a. The first securing bit or fastener 1278a may be both inserted through the junction rod 1276, such as a first eyelet or opening 1277 of the junction rod 1276, and nested within a fastening port or fastener opening 1280 within the locking portion 1202b of the pull release 1202 with the first eyelet 1277 coaxially aligned with the fastener opening 1280, such that the junction rod 1276 is secured to said pull release 1202, thus securing said pull release to the strap 1105. In some cases, the junction rod 1276 may be secured to the strap junction 1115 using strap joint to enable pivoting between the strap 1105 and pull release 1202.

A third securing bit 1178c utilizing a similar connection method may be used to secure the protrusion 1112 to the tether. Said protrusion 1112 may be nested or positioned within the guard 1119 such that a securing slot or eyelet 664 within the protrusion 1112 is aligned coaxially with a fastening port or fastener opening 1180 traveling through the guard 1119, such that the insertion of the third securing bit 1178c through the securing slot or eyelet 664 of the protrusion 1112 and simultaneous nesting (e.g., screwed in) of said securing bit 1178c within the fastening port 1180 of the guard 1119 securely fastens the protrusion 1112 to the guard 1119, similarly to the interconnection of the junction rod 1276 to the locking component 1202b of the pull release 1102.

The usage of these securing bits between the strap 1105 and swivel lock 1101 and the swivel lock 1101 and guard 1119 may facilitate the easier repair, replacement or modification of swivel lock assembly components. Due to the fact that the pull release 1102 and the protrusion 1112 may be completely disconnected from both the strap side elements (strap 1105, strap junction 1115) and the tether side elements (guard 1119, tether, floatation device/sports equipment), accordingly, through the removal of the corresponding securing bit, the various strap side elements and tether side elements may be exchanged at the will of the user. For example, the user may choose to attach a thicker tether to the swivel lock in order to maintain a stronger connection between the user and the sports equipment. In an alternative example, the user may implement a different style of strap that is designed to attach to their waist, rather than a limb. Due to the usage of the described first securing bit 1178a and third securing bit 1178c to attach the swivel lock 1101 to the tether and strap 1105, assembly elements, such as leashes, tethers, straps 1105 and guards 1119, may be changed at will to better accommodate the current application, thus providing the disclosed swivel lock 1101 with exceptional versatility. For example, the first securing bit 1178a may be removed to separate the swivel lock 1101 from a first strap 1105 and then reinstalled to attach a second strap to said swivel lock 1101. In another example, the third securing bit 1178c may be removed to separate the swivel lock 1101 from a first tether and then reinstalled to attach a second tether to said swivel lock 1101.

FIG. 13A, FIG. 13B and FIG. 13C illustrate the top, side and perspective views of an alternatively configured swivel lock 1301 with a grip cover 1366, respectively, according to an aspect. In the herein depicted alternative configuration of the swivel lock quick release device 1301, in order to disengage the pull release 1302 from the protrusion and thus the attached strap and sporting equipment, the user can pull the slide handle toward their body, specifically, whichever part of their strap 1305 is secured to. This differs from the disengagement process used for the exemplary embodiments of the swivel lock described in FIGS. 1-4E, in which the user can pull the slide handle away from their body in order to disengage the pull release from the protrusion. It may be preferable to provide the swivel lock 1301 in the alternative configuration depicted in FIG. 11 and FIG. 13A-13C, as it may be easier for a user to pull the slide handle toward themselves, rather than away from themselves, particularly in a dangerous situation. Line A-A of FIG. 13A may bisect the swivel lock 1301 to illustrate a cross sectional view of said swivel lock 1301 show in FIG. 11. When pulling the slide handle toward themself, a user may use their own body a backing support to ensure the swivel lock does not move unexpectedly during use, and that the two connectors may be separated quickly and easily. As a result of the swivel lock 1301 being compressed between the user and the hand they use to manipulate the slide handle, the user may have greater control over the swivel lock, ensuring they are capable of using it properly. The different configurations of the swivel lock 1301 are discussed in greater detail hereinbelow.

The disclosed swivel lock quick release device 1301 utilizing the herein described grip cover 1366 may provide a safe and effective method to secure a user to an object of their choosing. The construction of the swivel lock, with its usage of a protrusion-based locking system and various pivots, may facilitate simultaneous swiveling, rotation, and locking of said swivel lock, allowing it to swivel and rotate independently of its attached strap and tether/leash. The usage of the disclosed two-connector-based locking system may facilitate the use and reuse of the swivel lock quick release, without the fear of losing small components from disengaging of said connectors during use. The utilization of a grip cover may enhance a user's ability to grip the swivel lock 1301, even when it is wet, while simultaneously preventing the said swivel lock from harming the user or damaging surrounding equipment. The grip cover may also provide a waterproof seal around the swivel lock and allow it to float while submerged. By orienting the swivel lock 1301 such that the user pulls a slide handle toward their body to trigger disengagement of the two connectors, the user may be provided with a straightforward disengagement process in which they may use body as backing support to enable rapid disengagement.

It should be understood that the engaging and disengaging of a first connector attached to the guard 1319, and thus the tether, with a second connector attached to the strap junction 1315, and thus the strap 1305, may be referred to as "coupling" and "uncoupling", respectively. Thus, the engaging and disengaging of the protrusion attached to the tether with the pull release 1302 attached to the strap 1305, as described hereinabove, may be referred to as "coupling" and "uncoupling", respectively. As such, the process of inserting the protrusion 312 into the pull release 302, as shown in FIG. 3A, or otherwise engaging the first connector with the second connector, may be called "coupling", whereas the removal of the protrusion 312 from the pull release 302, as shown in FIG. 3D, or otherwise disengaging the first connector from the second connector, may be called "uncoupling".

When the protrusion and pull release are coupled, both elements may be coaxially aligned on an established engagement axis 1382. This disposition of both the protrusion and the pull release 1302 on this shared engagement axis 1382 makes it such that the uncoupling of the guard 1319, and thus the tether, from the strap 1305 is facilitated by an axial release of the protrusion from pull release 1302, in which said protrusion is moved axially along the engagement axis 1382 until it fully evacuates said pull release 1302, at which point the strap 1305 and tether are then uncoupled. The engagement axis 1382 can be, can correspond, or be generally parallel to a central axis of any component discussed herein of the swivel lock quick release device 1301 as discussed herein, such as the strap junction 1115, the junction rod 1176, the sleeve 1102a, the locking component 1102b, the protrusion 1112, the guard 1119, and/or the strap 1105. As described hereinabove, the disclosed swivel lock quick release device 1301 is configured to allow rapid, selective coupling and uncoupling of the tether to and from the strap, and thus rapid, selective coupling and uncoupling of the user to and from a sports equipment, floatation device, etc., making it suitable for utilization in safety equipment for various applications, such as watersports. It should be understood that the term "selectively coupled" may include that the disclosed selectively coupled elements may be coupled and uncoupled as desired, as is the case with the corresponding connectors of disclosed swivel lock quick release device 1301. The functionality of coupling and uncoupling or attaching and detaching, etc. may be described and otherwise disclosed without the term "selectively."

FIG. 14A illustrates the side perspective view of two different configurations of the disclosed swivel lock quick release device, according to an aspect. FIG. 14B illustrates the side perspective view a first configuration of the swivel lock quick release device 1401a, according to an aspect. FIG. 14C illustrates the perspective view of a second configuration of the swivel lock quick release 1401b, according to an aspect. As can be seen in FIG. 14A, the disclosed swivel lock quick release device may be configured in multiple ways depending on the preferred movement direction to uncouple the first and second connectors of said quick release device.

A first configuration of the swivel lock quick release device 1401a may be arranged such that a first connector, such as pull release 1402, may be attached to the strap junction 1415 and thus the strap 1405, while a second connector, such protrusion 1412, may be attached to the guard 1419, and thus the attached tether. As can be seen in FIG. 14B, the pull release 1402 may be oriented such that the grip 1403 is positioned closer to a user secured within the strap 1405. In such a configuration, the user will need to pull the grip 1403 and slide handle of said pull release 1402 toward themselves in order to uncouple the first and second connector, and thus separate themselves from tether secured object. This first configuration of swivel lock quick release 1401a may be preferred in application in which a user may prefer or be able to more easily pull the slide handle toward themselves in the situations that merit uncoupling (e.g., a dangerous scenario).

A second configuration of the swivel lock quick release 1401b may be arranged such that a first connector, such as a pull release 1402 may be attached to the guard 1419 and thus the attached tether, while a second connection, such as protrusion 1412, may be attached to the strap junction 1415, and thus the strap 1405. As can be seen in FIG. 14C, the pull release 1402 may be oriented such that the grip 1403 is positioned further away from the user secured within the strap 1405. In such a configuration, the user will need to push the grip 1403 and slide handle of said pull release 1402 away from themselves in order to uncouple the first and second connector, and thus separate themselves from the tether secured object. This second configuration of swivel lock quick release 1401b may be preferred in application in which a user may prefer or be able to more easily push the slide handle away from themselves.

It should be understood that while either configuration of the swivel lock quick release device 1401a, 1401b may provide a suitable mechanism for reversibly coupling and uncoupling the user to and from a sports equipment, one of said configurations may be preferable for most applications. Generally, the first configuration of the swivel lock quick release device 1401a may be preferred over the second configuration 1401b, as the closer positioning of the grip 1403 to the user and the use of a pulling motion toward the user for uncoupling may allow for faster, easier and more reproducible uncoupling. Additionally, as described previously, the first configuration 1401a may allow user to use their own body a backing support to ensure the swivel lock does not move unexpectedly during use, thus increasing the probability that the user can uncouple themselves from the sports equipment quickly during a dangerous scenario. This being said, whichever configuration allows for the fastest and easiest uncoupling for a specific application should be utilized over the alternative. In some cases, the first confirmation 1401a may be desirable in applications where the tether may break often. In such cases, the strap will often remain intact and can be reused. With the first configuration, the pull release 1102 can remain with the strap being reused, while the tether attached to the protrusion 1112 can be replaced. In general, the protrusion is likely to be the cheaper and easier to manufacture component that is replaced with the tether, while the pull release 1102 can be reused may time with the strap.

Figure 16A:
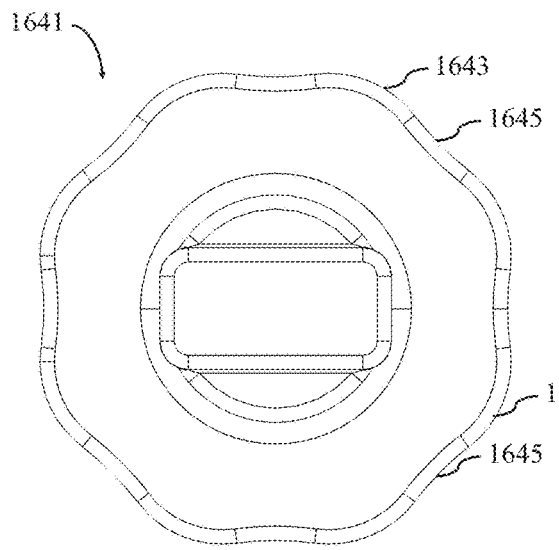
FIG. 16A illustrates an end view of a locking component of a swivel lock quick release device, according to an aspect.
Figure 16B:
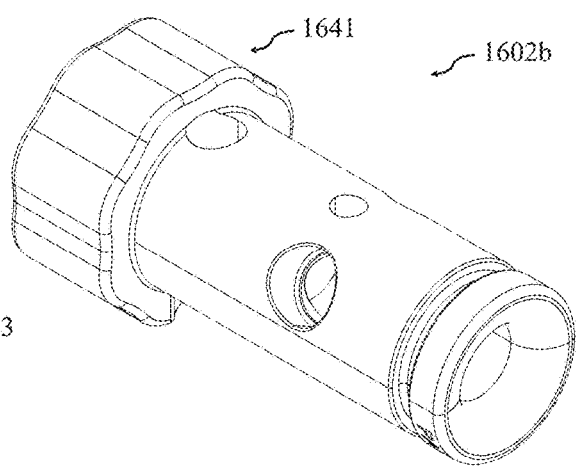
FIG. 16B illustrates a perspective view of a locking component of a swivel lock quick release device, according to an aspect.
Figure 16C:
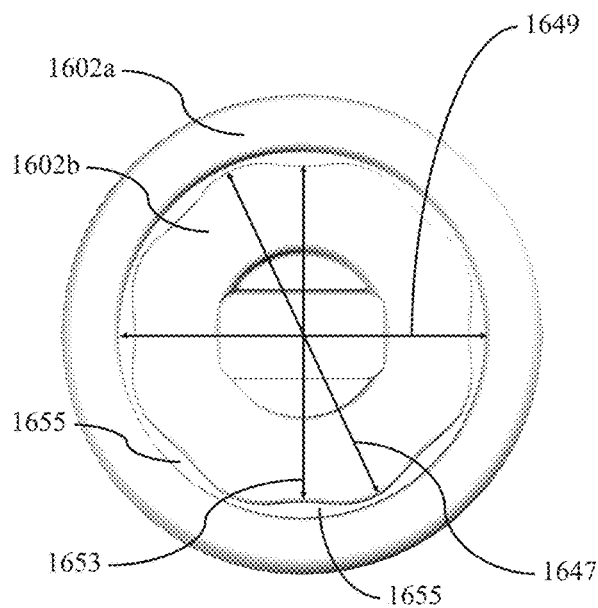
FIG. 16C illustrates an end view of a locking component and a slide handle of a swivel lock quick release device, according to an aspect.
Figure 16D:
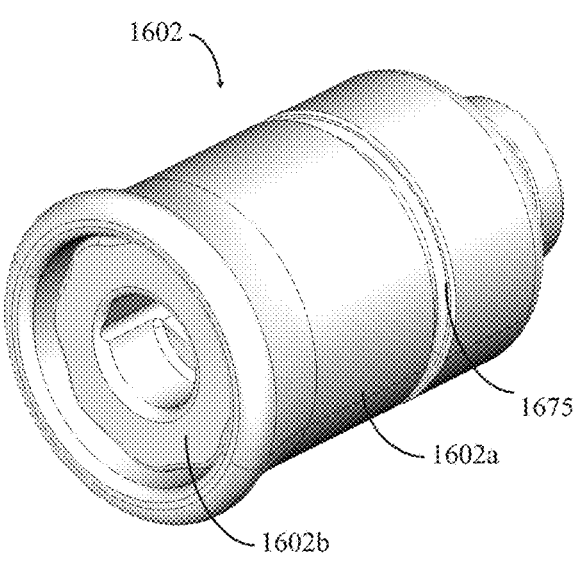
FIG. 16D illustrates a perspective view of a locking component and a slide handle of a swivel lock quick release device, according to an aspect.

FIG. 16A illustrates an end view, and FIG. 16B illustrates an isometric view, of the locking component 1602b of the pull release 1602 of a swivel lock, according to an aspect. FIG. 16C is an end view, and FIG. 16D is an isometric view, of the locking component 1602b, further illustrating the slide handle 1602a for reference with a ridge slot 1675 for connecting to an inner ridge of a grip cover as discussed herein.

A raised portion, head, protruding head, flange, or top 1641 of the perimeter of the locking component 1602b may have one or more ridges or projections 1643. The ridges 1643 may extend to a diameter 1647 approximately equal to or slightly less than the inner diameter 1649 of the slide handle 1602a. Thus, when the user desires to disengage a protrusion (1112) from the pull release 1602, they may pull on the slide handle 1602a, which is coaxially guided and balanced along the ridges 1643. Advantageously, the ridges 1643 provide support for the slide handle 1602a and guide the slide handle 1602a coaxially along the locking component 1602b.

The locking component 1602b may additionally, or alternatively, have one or more recesses or grooves 1645. The recesses 1645 may be disposed between the ridges 1643. Advantageously, the difference between the inner diameter 1649 of the slide handle 1602a and the diameter 1653 to which the recesses 1645 extends forms one or more spaces, pressure release passages 1655 disposed between the slide handle 1602a and the locking component 1602b. Thus, when the user pulls the slide handle 1602a of the pull release 1602, any fluids or small debris that may have entered the space between the slide handle 1602a and the locking component 1602b may escape or flow through the pressure release passage 1655. For example, when a user of the swivel lock utilizes the swivel lock for water sports, water may enter into the space between the slide handle 1602a and the locking component 1602b. If the user attempts to pull the pull release 1602 while water remains inside, the slide handle 1602a may be difficult to pull due to hydraulic pressure caused by the entrained water. By providing one or more pressure release passages 1655 through the recesses 1645, water within the pull release 1602 may escape when the user pulls the slide handle 1602a, preventing the pull release 1602 from becoming jammed.

In some embodiments of the locking component 1602b, there may be a single ridge 1643 defining an outer diameter of the locking component 1602b, and a single recess 1645. In some embodiments, there may be multiple ridges 1643 and recesses 1645. The number of ridges 1643 and recesses 1645 may be 1, 2, 3, 4, 8, or any other number. In some embodiments, the ridges 1643 and recesses 1645 of the locking component 1602b may be disposed around the perimeter of a portion of the length of the locking component 1602b in a generally uniformly such as in a star-shaped pattern, as illustrated in FIG. 16B.

Additionally, in some embodiments, the proportion of the perimeter of the locking component 1602b comprising ridges 1643 and the proportion comprising recesses 1645 may be equal, providing for a uniform pattern of ridges 1643 and recesses 1645 around the perimeter of the locking component 1602b. In some embodiments, the proportion of the perimeter comprising ridges 1643 may be different than the proportion comprising recesses 1645. For example, in some embodiments of the locking component 1602b, the proportion of the locking component's 1602b perimeter disposed as ridges 1643 may be greater than the proportion of the perimeter disposed as recesses 1645. Such a configuration would provide for greater coaxial stability of the slide handle 1602a at the expense of providing smaller pressure release passages 1655. In some embodiments, the proportion of the locking component's 1602b perimeter disposed as ridges 1643 may be less than the proportion of the perimeter disposed as recesses 1645. In contrast to the prior example, this configuration would allow for larger pressure release passages 1655 at the expense of providing less coaxial stability for the slide handle 1602a.

Figure 17A:
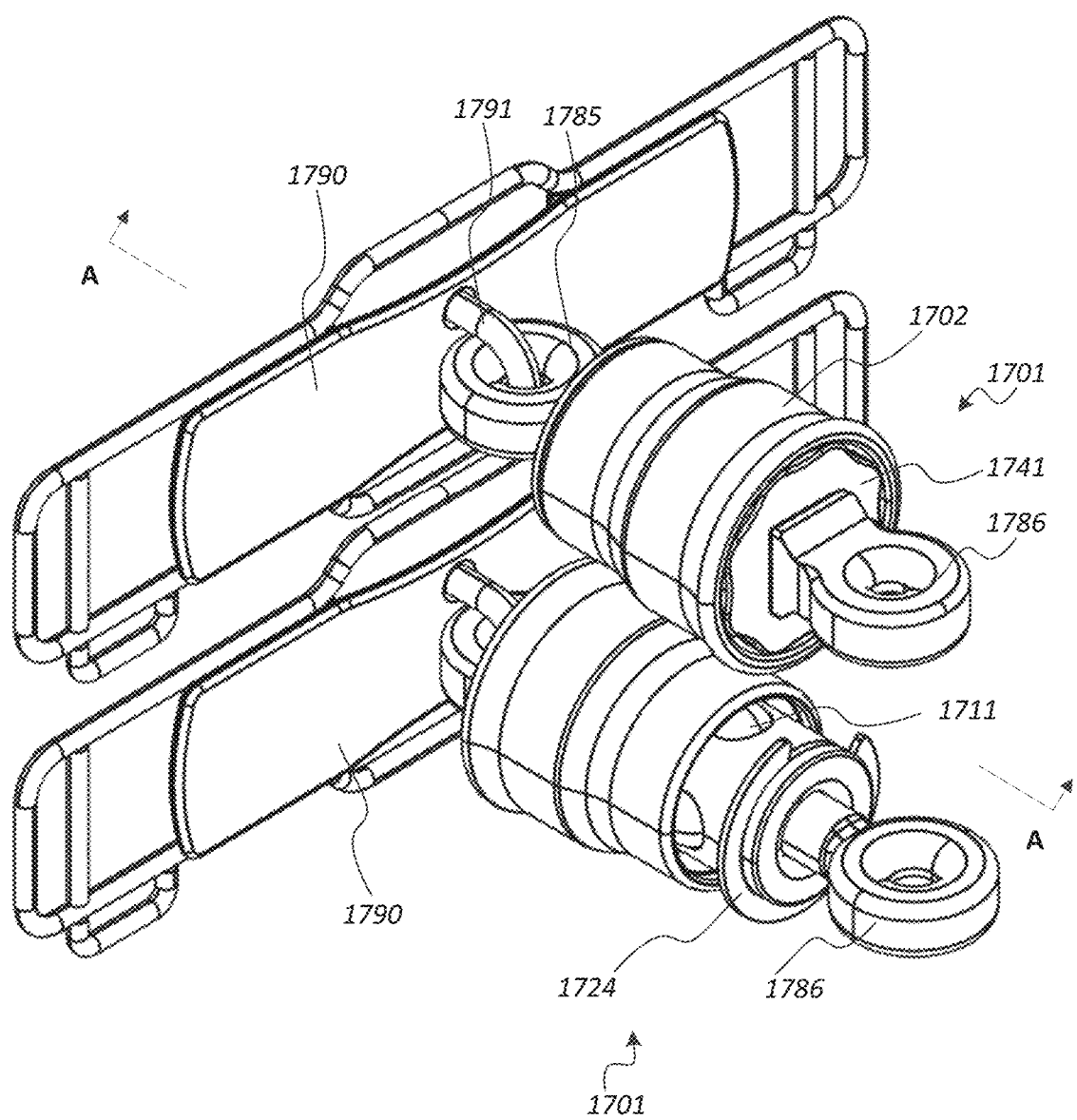
FIG. 17A illustrates the side perspective view of two configurations of the swivel lock quick release device, according to an aspect.
Figure 17B:
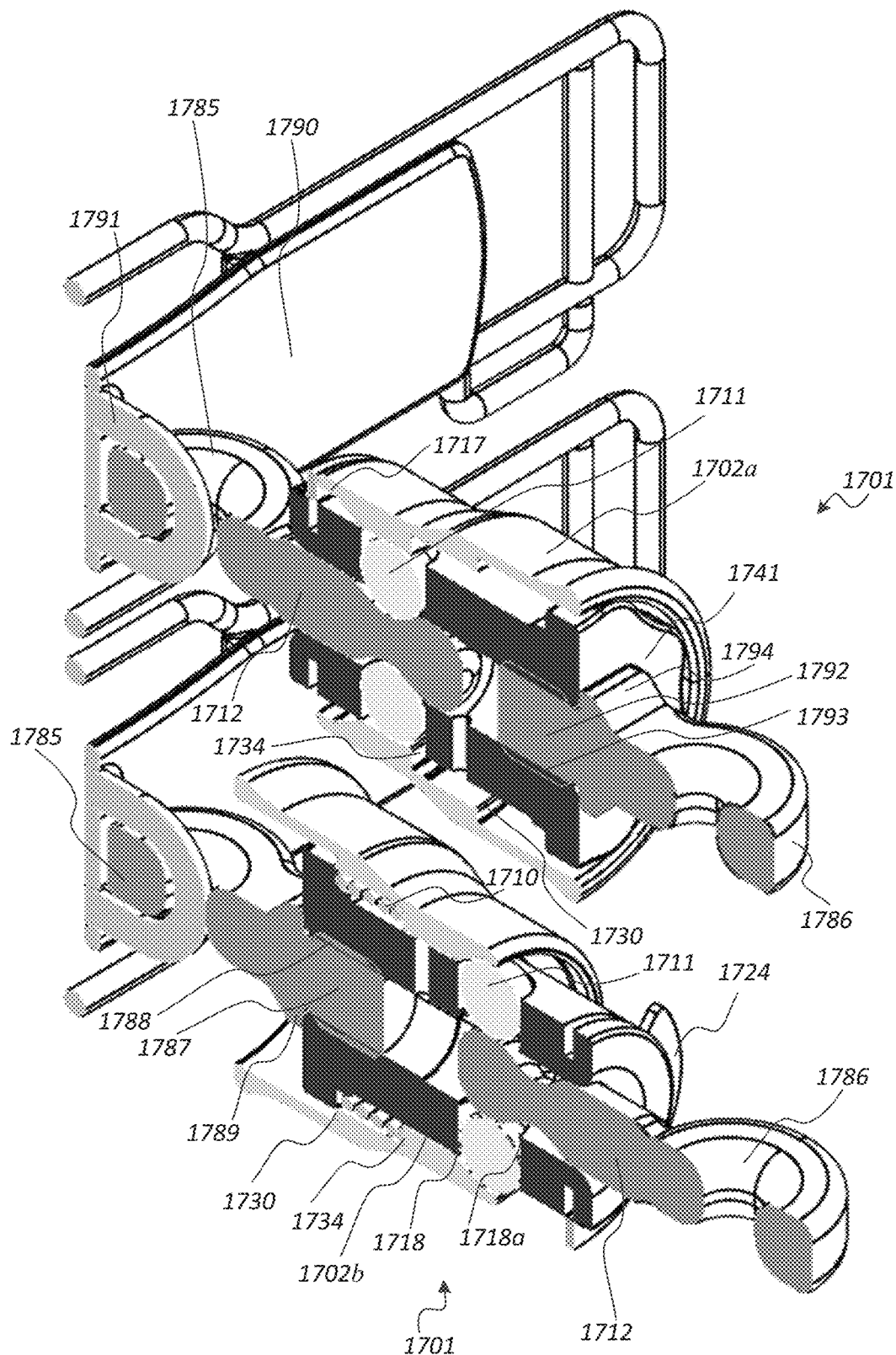
FIG. 17B illustrates a cross-sectional side perspective view the swivel lock quick release device along line A-A in FIG. 17A, according to an aspect.

FIG. 17A illustrates the side perspective view of two different configurations of the disclosed swivel lock quick release device, according to an aspect. FIG. 17B illustrates a cross-sectional side perspective view the swivel lock quick release device along line A-A in FIG. 17A, according to an aspect. As can be seen in FIGS. 17A and 17B, the disclosed swivel lock quick release device may be configured in multiple ways depending on the preferred movement direction to uncouple the first and second connectors of said quick release device.

As shown in FIGS. 17A and 17B, the swivel lock 1701 can have the pull release 1702, sleeve 1702a, locking component 1702b, spring 1710, ball 1711, protrusion 1712, ball housing 1718, groove 1717, lip 1718a, washer 1724, first ridge 1730, second ridge 1734, protruding head 1741, and/or other components and features discussed herein.

The pull release 1702 can be attached to equipment 1790 having a hook or ring 1791 of the equipment 1790 via a first connector 1785 of the pull release 1702. The equipment 1790 illustrated in FIGS. 17A and 17B can be part of a sailboat or sailing equipment. The first connector 1785 can be an eyelet, shackle, carabiner 1785. In some cases, the first connector 1785 can be monolithically formed or otherwise connected such as via threads with the protrusion 1712. In some cases, the first connector 1785 can be monolithically formed or otherwise connected such as via threads to a connecting shaft 1787. The connecting shaft 1787 can connect to the locking component 1702b. In some cases, the connecting shaft 1787 and the locking component 1702b may have corresponding threads 1788 to form a connection that can be quickly assembled and disassembled, engaged or disengaged, etc. In some cases, the connecting shaft 1787 and the locking component 1702b can be connected using any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof. The first connector 1785 can have a flange 1789 that determines the extent and relative axial movement of the connecting shaft 1787 relative to the locking component 1702b in, for example, threaded connections.

The pull release 1702 can be attached to a user via a second connector 1786 of the pull release 1702. The second connector 1786 can be an eyelet, shackle, carabiner 1786. In some cases, the second connector 1786 can be monolithically formed or otherwise connected such as via threads with the protrusion 1712. In some cases, the second connector 1786 can be monolithically formed or otherwise connected such as via threads to a connecting shaft 1792. The connecting shaft 1792 can connect to the locking component 1702*b*. In some cases, the connecting shaft 1792 and the locking component 1702*b* may have corresponding threads 1793 to form a connection that can be quickly assembled and disassembled, engaged or disengaged, etc. In some cases, the connecting shaft 1792 and the locking component 1702*b* can be connected using any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof. The second connector 1786 can have a flange 1794 that determines the extent and relative axial movement of the connecting shaft 1792 relative to the locking component 1702*b* in, for example, threaded connections.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "generally", "approximately", "about", and "substantially" as used herein represent the feature with some variability that still performs a desired function or achieves a desired result for that feature. The term "substantially flush" or "generally flush" as used herein may refer to surfaces that are in the same plane or are co-planar, with the respective plane corresponding to each surface being separated by a distance of less than or equal to 3 millimeters. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees, and the term "generally perpendicular" can refer to something that departs from exactly perpendicular by less than or equal to 20 degrees.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A swivel lock quick release device configured to attach a user to equipment, the swivel lock quick release device comprising:
    a stem comprising a head and an indentation connected to the head, the indentation radially extending about a central axis of the stem, the stem configured to attach to a tether attached to equipment; and
    a pull release configured to connect to a strap for attaching to a user, the pull release comprising:
        a sleeve comprising a coaxial opening having an inner surface and a groove on the inner surface;
        a locking body positioned at least partially within the coaxial opening of the sleeve, the locking body comprising:
            a recess positioned within the locking body, the recess configured to receive the stem; and
            a ball housing extending radially through the locking body;
        a ball positioned within the ball housing; and
        a spring positioned between the sleeve and the locking body, wherein the sleeve is configured to move between a first position and a second position relative to the locking body, wherein the spring biases the sleeve to the first position from the second position,
        wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body,
        wherein in the first position, the pull release is configured to swivel relative to the stem by the ball moving in the indentation about the central axis of the stem,
        wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body, and
        wherein the locking body comprises a flange, the flange comprising one or more ridges and one or more recesses, wherein a first diameter, to which the ridges extend to, extends to a diameter of the inner surface, and wherein a second diameter, to which the recesses extend to, is less than the first diameter, wherein the recesses provide corresponding spaces between the flange and the inner surface to allow for flow of fluid in the spaces between the flange and the inner surface.

2. The swivel lock quick release device of claim 1, wherein the ridges extend to and contact the inner surface to coaxially guide the sleeve relative to the locking body.

3. The swivel lock quick release device of claim 1, wherein the spring presses against the flange of the locking body to bias the sleeve toward the first position relative to the locking body.

4. The swivel lock quick release device of claim 1, wherein the sleeve comprises a first ridge on the inner surface, wherein the first ridge presses against the flange in the second position to inhibit further axial movement of the sleeve from the first position to the second position.

5. The swivel lock quick release device of claim 1, wherein the sleeve comprises a second ridge on the inner surface, and wherein the spring presses against the second ridge of the sleeve to bias the sleeve into the first position relative to the locking body.

6. The swivel lock quick release device of claim 1, wherein the groove is positioned proximate an end of the sleeve.

7. The swivel lock quick release device of claim 6, wherein the groove is positioned at the end of the sleeve.

8. The swivel lock quick release device of claim 1, wherein the ball housing comprises a lip extending into the ball housing, the lip having a smaller perimeter than a diameter of the ball, the lip configured to inhibit inward radial movement of the ball into the recess out of the ball housing.

9. The swivel lock quick release device of claim 1, wherein the locking body comprises a channel configured to receive a washer to prevent the sleeve from traveling past the channel, wherein the spring is configured to bias the sleeve to the first position to position the sleeve against the washer in the first position.

10. The swivel lock quick release device of claim 1, further comprising a junction rod configured to connect the pull release and the strap, wherein the junction rod comprises a first eyelet, and the locking body comprises a fastener opening, the junction rod configured to extend into the locking body to position the first eyelet relative to the fastener opening of the locking body for a first fastener to extend into the fastener opening of the locking body through the first eyelet to secure the junction rod to the pull release.

11. The swivel lock quick release device of claim 1, wherein the stem comprises an eyelet, the stem configured to extend into a guard attachment of the tether to position the eyelet of the stem relative to a fastener opening of the guard attachment for a third fastener to extend into a fastener opening of the guard attachment through the eyelet of the stem to secure the stem to the tether.

12. A swivel lock quick release device configured to attach a user to equipment, the swivel lock quick release device comprising:
    a stem comprising a head and an indentation connected to the head, the indentation radially extending about a central axis of the stem, the stem configured to attach to a tether attached to equipment; and
    a pull release configured to connect to a strap for attaching to a user, the pull release comprising:

a sleeve comprising a coaxial opening having an inner surface and a groove on the inner surface;

a locking body positioned at least partially within the coaxial opening of the sleeve, the locking body comprising:

a recess positioned within the locking body, the recess configured to receive the stem; and a ball housing extending radially through the locking body;

a ball positioned within the ball housing; and a spring positioned between the sleeve and the locking body, wherein the sleeve is configured to move between a first position and a second position relative to the locking body, wherein the spring biases the sleeve to the first position from the second position, wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body, wherein in the first position, the pull release is configured to swivel relative to the stem by the ball moving in the indentation about the central axis of the stem, wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body, and wherein the locking body comprises a channel configured to receive a washer to prevent the sleeve from traveling past the channel, wherein the spring is configured to bias the sleeve to the first position to position the sleeve against the washer in the first position.

13. The swivel lock quick release device of claim 12, wherein the locking body comprises a flange, the flange comprising one or more ridges and one or more recesses, wherein a first diameter, to which the ridges extend to, extends to a diameter of the inner surface, and wherein a second diameter, to which the recesses extend to, is less than the first diameter, wherein the recesses provide corresponding spaces between the flange and the inner surface to allow for flow of fluid in the spaces between the flange and the inner surface.

14. The swivel lock quick release device of claim 13, wherein the ridges extend to and contact the inner surface to coaxially guide the sleeve relative to the locking body.

15. The swivel lock quick release device of claim 12, further comprising a junction rod configured to connect the pull release and the strap, wherein the junction rod comprises a first eyelet, and the locking body comprises a fastener opening, the junction rod configured to extend into the locking body to position the first eyelet relative to the fastener opening of the locking body for a first fastener to extend into the fastener opening of the locking body through the first eyelet to secure the junction rod to the pull release.

16. The swivel lock quick release device of claim 12, wherein the stem comprises an eyelet, the stem configured to extend into a guard attachment of the tether to position the eyelet of the stem relative to a fastener opening of the guard attachment for a third fastener to extend into a fastener opening of the guard attachment through the eyelet of the stem to secure the stem to the tether.

17. A swivel lock quick release device configured to attach a user to equipment, the swivel lock quick release device comprising:

a stem comprising a head and an indentation connected to the head, the indentation radially extending about a central axis of the stem, the stem configured to attach to a tether attached to equipment; and a pull release configured to connect to a strap for attaching to a user, the pull release comprising:

a sleeve comprising a coaxial opening having an inner surface and a groove on the inner surface;

a locking body positioned at least partially within the coaxial opening of the sleeve, the locking body comprising:

a recess positioned within the locking body, the recess configured to receive the stem; and a ball housing extending radially through the locking body;

a ball positioned within the ball housing; and a spring positioned between the sleeve and the locking body, wherein the sleeve is configured to move between a first position and a second position relative to the locking body, wherein the spring biases the sleeve to the first position from the second position, wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body, wherein in the first position, the pull release is configured to swivel relative to the stem by the ball moving in the indentation about the central axis of the stem, and wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body; and a junction rod configured to connect the pull release and the strap, wherein the junction rod comprises a first eyelet, and the locking body comprises a fastener opening, the junction rod configured to extend into the locking body to position the first eyelet relative to the fastener opening of the locking body for a first fastener to extend into the fastener opening of the locking body through the first eyelet to secure the junction rod to the pull release.

18. The swivel lock quick release device of claim 17, wherein the junction rod comprises a second eyelet, the junction rod configured to extend into a strap junction to position the second eyelet relative to a fastener opening of the strap junction for a second fastener to extend into the fastener opening of the strap junction through the second eyelet to secure the junction rod to the strap.

19. The swivel lock quick release device of claim 18, wherein the first eyelet and the second eyelet of the junction rod are positioned perpendicular relative to each other.

20. The swivel lock quick release device of claim 17, wherein the locking body comprises a flange, the flange comprising one or more ridges and one or more recesses, wherein a first diameter, to which the ridges extend to, extends to a diameter of the inner surface, and wherein a second diameter, to which the recesses extend to, is less than the first diameter, wherein the recesses provide corresponding spaces between the flange and the inner surface to allow for flow of fluid in the spaces between the flange and the inner surface.

21. The swivel lock quick release device of claim 17, wherein the locking body comprises a channel configured to receive a washer to prevent the sleeve from traveling past the channel, wherein the spring is configured to bias the sleeve to the first position to position the sleeve against the washer in the first position.

22. The swivel lock quick release device of claim 17, wherein the stem comprises an eyelet, the stem configured to extend into a guard attachment of the tether to position the eyelet of the stem relative to a fastener opening of the guard attachment for a third fastener to extend into a fastener opening of the guard attachment through the eyelet of the stem to secure the stem to the tether.

23. A swivel lock quick release device configured to attach a user to equipment, the swivel lock quick release device comprising:
- a stem comprising a head and an indentation connected to the head, the indentation radially extending about a central axis of the stem, the stem configured to attach to a tether attached to equipment; and
- a pull release configured to connect to a strap for attaching to a user, the pull release comprising:
  - a sleeve comprising a coaxial opening having an inner surface and a groove on the inner surface;
  - a locking body positioned at least partially within the coaxial opening of the sleeve, the locking body comprising:
    - a recess positioned within the locking body, the recess configured to receive the stem; and
    - a ball housing extending radially through the locking body;
  - a ball positioned within the ball housing; and
  - a spring positioned between the sleeve and the locking body, wherein the sleeve is configured to move between a first position and a second position relative to the locking body, wherein the spring biases the sleeve to the first position from the second position,
  - wherein in the first position, the inner surface of the coaxial opening of the sleeve moves the ball in the ball housing radially inward at least partially into the indentation of the stem with the stem in the recess to position the ball against the head within the indentation to prevent axial movement of the stem relative to the locking body,
  - wherein in the first position, the pull release is configured to swivel relative to the stem by the ball moving in the indentation about the central axis of the stem, and
  - wherein in the second position, the groove of the sleeve is positioned radially about the ball to allow radial outward movement of the ball in the ball housing at least partially into the groove and out of the indentation of the stem with the stem in the recess to allow axial movement of the stem relative to the locking body,
- wherein the stem comprises an eyelet, the stem configured to extend into a guard attachment of the tether to position the eyelet of the stem relative to a fastener opening of the guard attachment for a third fastener to extend into a fastener opening of the guard attachment through the eyelet of the stem to secure the stem to the tether.

24. The swivel lock quick release device of claim 23, wherein the locking body comprises a flange, the flange comprising one or more ridges and one or more recesses, wherein a first diameter, to which the ridges extend to, extends to a diameter of the inner surface, and wherein a second diameter, to which the recesses extend to, is less than the first diameter, wherein the recesses provide corresponding spaces between the flange and the inner surface to allow for flow of fluid in the spaces between the flange and the inner surface.

25. The swivel lock quick release device of claim 23, wherein the locking body comprises a channel configured to receive a washer to prevent the sleeve from traveling past the channel, wherein the spring is configured to bias the sleeve to the first position to position the sleeve against the washer in the first position.

26. The swivel lock quick release device of claim 23, further comprising a junction rod configured to connect the pull release and the strap, wherein the junction rod comprises a first eyelet, and the locking body comprises a fastener opening, the junction rod configured to extend into the locking body to position the first eyelet relative to the fastener opening of the locking body for a first fastener to extend into the fastener opening of the locking body through the first eyelet to secure the junction rod to the pull release.

* * * * *